(12) United States Patent
Zhou et al.

(10) Patent No.: US 12,045,323 B2
(45) Date of Patent: *Jul. 23, 2024

(54) SYSTEMS AND METHODS FOR REMOTELY VERIFYING IDENTITY OF NON-RESIDENT ALIENS

(71) Applicant: East West Bank, Pasadena, CA (US)

(72) Inventors: Catherine Zhou, Mountain View, CA (US); Rakesh Nambiar, Redwood City, CA (US); Angela Mao, Pasadena, CA (US)

(73) Assignee: EAST WEST BANK, Pasadena, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/665,323

(22) Filed: Feb. 4, 2022

(65) Prior Publication Data

US 2022/0156348 A1 May 19, 2022

Related U.S. Application Data

(63) Continuation of application No. 17/458,047, filed on Aug. 26, 2021, now Pat. No. 11,244,033, which is a
(Continued)

(51) Int. Cl.
*G06F 21/12* (2013.01)
*G06F 21/44* (2013.01)
*G06Q 50/26* (2024.01)

(52) U.S. Cl.
CPC ............ *G06F 21/128* (2013.01); *G06F 21/44* (2013.01); *G06Q 50/265* (2013.01)

(58) Field of Classification Search
None
See application file for complete search history.

(56) References Cited

U.S. PATENT DOCUMENTS 6,758,394 B2  7/2004  Maskatiya et al.
7,003,669 B2  2/2006  Monk
(Continued)

FOREIGN PATENT DOCUMENTS

CA     2748676 A1 *  1/2010  ....... G06F 17/30303
KR  10-2012-0032508 A    4/2012
(Continued)

OTHER PUBLICATIONS

International Search Report and Written Opinion of the International Searching Authority dated Jan. 29, 2021, for International Application No. PCT/US2020/055081, 11 pages.

*Primary Examiner* — Piotr Poltorak
*Assistant Examiner* — Felicia Farrow
(74) *Attorney, Agent, or Firm* — Lewis Roca Rothgerber Christie LLP

(57) ABSTRACT

A method for remotely verifying a non-resident alien's identity, includes: receiving a request to establish a communication session from a user device; analyzing the request to determine whether the user device is compromised; in response to determining that the user device is not compromised, providing a page flow to the user device to solicit information from the non-resident alien, the information including identity information associated with a local foreign government identification document (ID), and other information not shown on the local foreign government ID; querying one or more foreign governmental data stores to identify foreign data associated with the non-resident alien based on a unique identifier associated with the local foreign government ID; comparing the information with the foreign data; and verifying an identity of the non-resident alien based on the comparing, wherein the verifying includes determining that at least one of the other information matches the foreign data.

10 Claims, 9 Drawing Sheets

Related U.S. Application Data continuation of application No. 16/686,768, filed on Nov. 18, 2019, now Pat. No. 11,144,619.

(60) Provisional application No. 62/914,363, filed on Oct. 11, 2019.

(56) References Cited

U.S. PATENT DOCUMENTS

| | | |
|---|---|---|
| 7,506,031 B2 | 3/2009 | Malik |
| 7,634,063 B2 | 12/2009 | Mardirossian |
| 7,950,577 B1 | 5/2011 | Daniel |
| 8,117,284 B2 | 2/2012 | Light et al. |
| 8,224,753 B2 | 7/2012 | Atef et al. |
| 9,262,642 B1 | 2/2016 | Roth et al. |
| 9,525,684 B1 * | 12/2016 | Brandwine ............ H04L 63/083 |
| 10,171,495 B1 * | 1/2019 | Bowen ................ H04L 63/1425 |
| 2009/0064334 A1 | 3/2009 | Halcomb |
| 2016/0140556 A1 | 5/2016 | Lee et al. |
| 2017/0251347 A1 | 8/2017 | Mehta et al. |
| 2018/0121919 A1 * | 5/2018 | Song ................. G06Q 20/3821 |

FOREIGN PATENT DOCUMENTS

| | | |
|---|---|---|
| KR | 10-1437235 B1 | 10/2014 |
| WO | 2018/117288 A1 | 6/2018 |
| WO | WO-2018117288 A1 * | 6/2018 |

\* cited by examiner

SYSTEMS AND METHODS FOR REMOTELY VERIFYING IDENTITY OF NON-RESIDENT ALIENS

CROSS-REFERENCE TO RELATED APPLICATION(S)

This application is a continuation of U.S. patent application Ser. No. 17/458,047, filed Aug. 26, 2021, which is a continuation of U.S. patent application Ser. No. 16/686,768, filed Nov. 18, 2019, now U.S. Pat. No. 11,144,619, which claims priority to and the benefit of U.S. Provisional Application No. 62/914,363, filed on Oct. 11, 2019, and entitled "SYSTEMS AND METHODS FOR REMOTE ONBOARDING OF NON-RESIDENT ALIENS," the entire contents of both of which are incorporated herein by reference.

BACKGROUND

Generally, the onboarding process for new customers of a provider institution, such as a financial institution, for example, requires the potential customer to make an in-person visit to a branch location of the provider institution, where the potential customer must present proper identification documentation to a branch employee in order to open a new account. Such identification documentation generally includes a driver's license or other form of government issued picture identification document (e.g., a passport), along with a social security number. The branch employee is then responsible for visually verifying that the potential customer is the same person claimed to be shown on the driver's license or other form of government issued picture identification document, and the social security number is cross-checked against social security records of a credible source (e.g., a credit bureau, Social Security Office, and/or the like), so that potential risks associated with the potential customer can be identified and weighed. For example, the cross-checking of the potential customer's social security number may result in identifying potential fraud risks or activities associated with the potential customer, credit worthiness of the potential customer, and/or the like.

While such in-person onboarding processes have been traditionally effective for legal residents having a social security number that can be independently verified from a credible domestic source, many provider institutions place restrictions on non-resident aliens from opening accounts as there may not be domestic consumer databases available to perform verification for non-US individuals. For example, even if the non-resident alien can present a foreign passport for visual inspection, non-resident aliens may not have a social security number that can be used to independently verify the identity and/or potential risks associated with the non-resident alien. Further, even if the provider institution allows non-resident aliens to open an account, the provider institution may require the non-resident aliens to visit a branch location in-person to present a foreign passport and various other documentations (e.g., employment records, paystubs, and the like) for manual visual inspection, as the provider institution may not be able to independently verify the non-US individual's identity from a credible source. Moreover, such manual visual inspection of various documentations may take days or even weeks to complete.

These issues may be further exacerbated for non-resident aliens that may be outside of the country and/or may not have a foreign passport to present in-person at a branch location of the provider institution. As a result, a vast majority of provider institutions opt not to offer their services to non-resident aliens who do not possess particular forms of US identification and/or who cannot visit a physical branch of the institution.

Accordingly, systems and methods that enable remote identity verification for onboarding non-resident aliens who only have a local foreign government-issued identification document may be desired. Provider institutions who utilize these systems and methods would thereby have the potential to significantly expand their customer bases.

The above information disclosed in this Background section is for enhancement of understanding of the background of the invention, and therefore, it may contain information that does not constitute prior art.

SUMMARY

According to one or more example embodiments, a method for remotely verifying a non-resident alien's identity, includes: receiving, by one or more processors, a request to establish a communication session from a user device associated with the non-resident alien; analyzing, by the one or more processors, the request to determine whether the user device is compromised; determining, by the one or more processors, that the user device is not compromised; in response to determining that the user device is not compromised, providing, by the one or more processors, a page flow to the user device to solicit information from the non-resident alien, the information including identification information shown on a local foreign government identification document (ID), and other information not shown on the local foreign government ID; receiving, by the one or more processors, the information from the user device; querying, by the one or more processors, one or more foreign governmental data stores to identify foreign data associated with the non-resident alien based on a unique identifier associated with the local foreign government ID; comparing, by the one or more processors, the information with the foreign data; and verifying, by the one or more processors, an identity of the non-resident alien based on the comparing, wherein the verifying includes determining, by the one or more processors, that at least one of the other information not shown on the local foreign government ID matches the foreign data.

In one or more example embodiments, the analyzing of the request to determine whether the device is compromised may include: identifying, by the one or more processors, a source address from session information included in the request; and determining, by the one or more processors, whether the source address corresponds to a blocked geographical location.

In one or more example embodiments, the determining whether the source address corresponds to a blocked geographical location may include: comparing, by the one or more processors, the source address with a list of blocked IP addresses.

In one or more example embodiments, the analyzing of the request to determine whether the device is compromised may include: identifying, by the one or more processors, device information associated with the user device, the device information included in the request; and determining, by the one or more processors, whether the user device has malware based on the device information.

In one or more example embodiments, the determining of whether the user device has malware may include: identifying, by the one or more processors, one or more applications installed on the user device; and comparing, by the one or more processors, the one or more applications with a list of applications known to be associated with malware.

In one or more example embodiments, the method may further include: validating, by the one or more processors, the information against one or more domestic governmental data stores; validating, by the one or more processors, the information against one or more watch-list data stores; and generating, by the one or more processors, a validation score corresponding to a risk probability associated with the non-resident alien, the validation score including a first score component and a second score component.

In one or more example embodiments, the validating of the information against the one or more domestic governmental data stores and the validating of the information against the one or more watch-list data stores may be performed, by the one or more processors, concurrently.

In one or more example embodiments, the validating of the information against the one or more domestic governmental data stores may include: querying, by the one or more processors, one or more domestic governmental data stores based on the information to identify domestic data corresponding to the non-resident alien; comparing, by the one or more processors, the information with the domestic data; identifying, by the one or more processors, one or more names associated with the domestic data that are similar to or the same as a name of the non-resident alien; and calculating, by the one or more processors, a first validation score indicating a probability match that the one or more similar or the same names correspond to the non-resident alien.

In one or more example embodiments, the validating of the information against the one or more watch-list data stores may include: querying, by the one or more processors, one or more watch-list data stores based on the information to identify watch-list data corresponding to the non-resident alien; comparing, by the one or more processors, the information with the watch-list data; identifying, by the one or more processors, one or more names associated with the watch-list data that are similar to or the same as a name of the non-resident alien; and calculating, by the one or more processors, a second validation score indicating a probability match that the one or more similar or the same names correspond to the non-resident alien.

In one or more example embodiments, the method may further include: comparing, by the one or more processors, the first validation score with a first threshold value to determine the first score component of the validation score; comparing, by the one or more processors, the second validation score with a second threshold value to determine the second score component of the validation score; determining, by the one or more processors, whether each of the first score component and the second score component indicates a passing score; and assigning, by the one or more processors, a status to an application associated with the non-resident alien based on the first score component and the second score component. The application may be automatically approved, by the one or more processors, in response to both the first score component and the second score component indicating the passing score, and the application may be flagged, by the one or more processors, in a pending state for further review in response to at least one of the first score component and the second score component indicating a failing score.

According to one or more example embodiments, a system for remotely verifying a non-resident alien's identity, includes: one or more processors; and memory coupled to the one or more processors and storing instructions that, when executed by the one or more processors, cause the one or more processors to: receive a request to establish a communication session from a user device associated with the non-resident alien; analyze the request to determine whether the user device is compromised; determine that the user device is not compromised; in response to determining that the user device is not compromised, provide a page flow to the user device to solicit information from the non-resident alien, the information including identification information shown on a local foreign government identification document (ID), and other information not shown on the local foreign government ID; receive the information from the user device; query one or more foreign governmental data stores to identify foreign data associated with the non-resident alien based on a unique identifier associated with the local foreign government ID; compare the information with the foreign data; and verify an identity of the non-resident alien based on the compare, wherein the verifying includes determining that at least one of the other information not shown on the local foreign government ID matches the foreign data.

In one or more example embodiments, to analyze the request to determine whether the device is compromised, the instructions may further cause the one or more processors to: identify a source address from session information included in the request; and determine whether the source address corresponds to a blocked geographical location.

In one or more example embodiments, to determine whether the source address corresponds to a blocked geographical location, the instructions may further cause the one or more processors to: compare the source address with a list of blocked IP addresses.

In one or more example embodiments, to analyze the request to determine whether the device is compromised, the instructions may further cause the one or more processors to: identify device information associated with the user device, the device information included in the request; and determine whether the user device has malware based on the device information.

In one or more example embodiments, to determine whether the user device has malware, the instructions may further cause the one or more processors to: identify one or more applications installed on the user device; and compare the one or more applications with a list of applications known to be associated with malware.

In one or more example embodiments, the instructions may further cause the one or more processors to: validate the information against one or more domestic governmental data stores; validate the information against one or more watch-list data stores; and generate a validation score corresponding to a risk probability associated with the non-resident alien, the validation score including a first score component and a second score component.

In one or more example embodiments, the validating of the information against the one or more domestic governmental data stores and the validating of the information against the one or more watch-list data stores may be performed concurrently.

In one or more example embodiments, to validate the information against the one or more domestic governmental data stores, the instructions may further cause the one or more processors to: query one or more domestic governmental data stores based on the information to identify domestic data corresponding to the non-resident alien; compare the information with the domestic data; identify one or more names associated with the domestic data that are similar to or the same as a name of the non-resident alien;

and calculate a first validation score indicating a probability match that the one or more similar or the same names correspond to the non-resident alien.

In one or more example embodiments, to validate the information against the one or more watch-list data stores, the instructions may further cause the one or more processors to: query one or more watch-list data stores based on the information to identify watch-list data corresponding to the non-resident alien; compare the information with the watch-list data; identify one or more names associated with the watch-list data that are similar to or the same as a name of the non-resident alien; and calculate a second validation score indicating a probability match that the one or more similar or the same names correspond to the non-resident alien.

In one or more example embodiments, the instructions may further cause the one or more processors to: compare the first validation score with a first threshold value to determine the first score component of the validation score; compare the second validation score with a second threshold value to determine the second score component of the validation score; determine whether each of the first score component and the second score component indicates a passing score; and assign a status to an application associated with the non-resident alien based on the first score component and the second score component. The application may be automatically approved in response to both the first score component and the second score component indicating the passing score, and the application may be flagged in a pending state for further review in response to at least one of the first score component and the second score component indicating a failing score.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Figure 1:
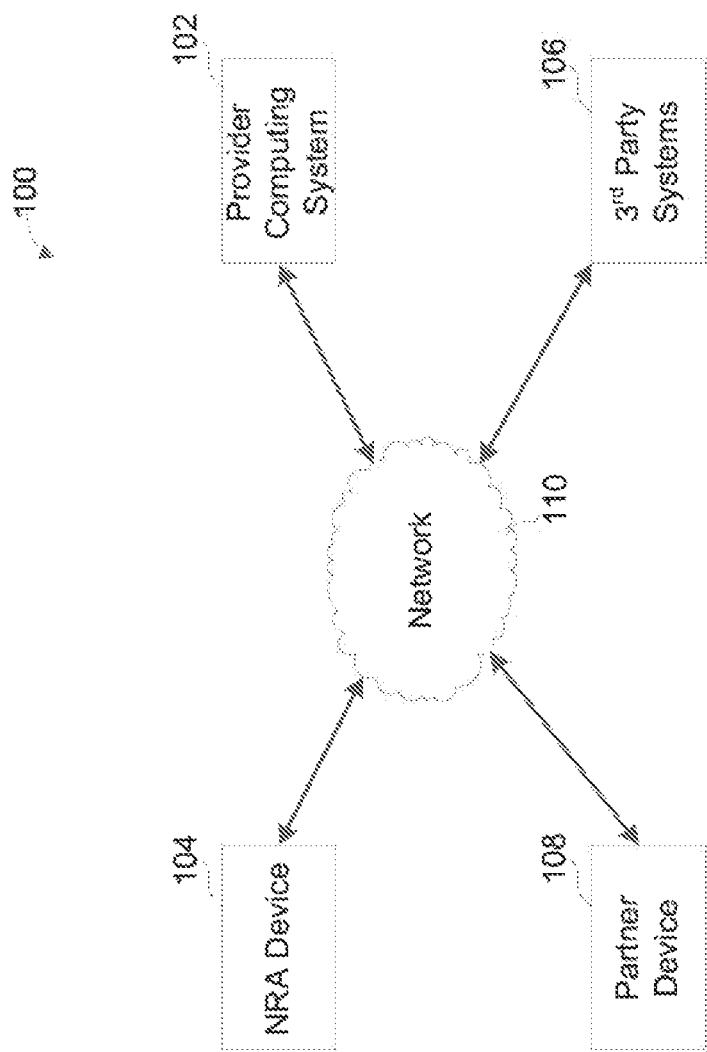
FIG. 1 is a block diagram of a system for remotely verifying the identity of a non-resident alien, according to some example embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more example embodiments of the present invention may be directed to systems and methods for remotely verifying the identity of non-resident aliens (NRAs), whom may be located anywhere in the world. For example, in some embodiments, the systems and methods described herein enable global access to a provider computing system for potential NRA customers by enabling automatic verification of the identity of the potential NRA customers, and automatic identification of potential risks associated with the potential NRA customers and/or devices used by the potential NRA customers to exchange data communications with the provider computing system. The systems and methods described herein improve computer-related technologies by performing certain processes and methods that cannot be done by conventional provider institution systems or human actors. For example, the systems and methods described herein provide a technical solution to a problem that is necessarily rooted in internet-centric technologies, that is, the ability to distinguish between real potential customers and fraudulent actors who may pose as a potential customer by analyzing data communications received from a user device (e.g., an NRA device). In some embodiments, the systems and methods described herein may provide real-time identity identification and risk assessment of NRA customers remotely, such that applications for the NRA customers may be automatically approved in real-time (or near real-time) without any human intervention. In some embodiments, the system and methods described herein may reduce the amount of processing workloads on resources (e.g., one or more processors) thereof.

FIG. 1 is a block diagram of a system for remotely verifying the identity of a non-resident alien, according to some example embodiments. The system 100 shown in FIG. 1 may be used, for example, to on-board non-resident aliens remotely, but the present disclosure is not limited thereto.

In brief overview, a provider institution associated with a provider computing system 102 may be, for example, a financial institution that is domiciled (e.g., headquartered) in a domestic state (e.g., a domestic country). However, the present disclosure is not limited thereto, and in other embodiments, the provider institution may be any suitable institution or entity that is domiciled in the domestic state and that provides a product or service on an ongoing basis (e.g., a subscription-based service, a ride-sharing service, gaming service, data storage service, cloud service, or the like). A non-resident alien (NRA) user (e.g., a user or customer that is not domiciled in the domestic state) associated with an NRA device 104 is a potential customer of the provider institution. The NRA user may be any suitable entity (e.g., an individual, a company, or the like) that is domiciled in and/or is a citizen of a foreign state (e.g., a foreign country) different from the domestic state.

Accordingly, the NRA user may be unable to present suitable identification documentation in-person at a branch location of the provider institution for manual inspection. For example, the NRA user may not have suitable identification documentation (e.g., a foreign passport, social security number, and/or the like), the NRA user may be located outside of the domestic state, the provider institution may not have a physical presence (e.g. a physical branch location) within the foreign state, a branch location of the provider institution may be too far for the NRA user to travel to, and/or the like. Thus, in some embodiments, the NRA user may use the NRA device 104 to communicate with the provider computing system 102 over a communication network 110 to apply for an account with the provider institution remotely.

For example, in some embodiments, the NRA device 104 may include any suitable device that is capable of accessing an online website or an online store associated with the provider institution, such as a desktop computer, a laptop, a tablet, a smart phone, a mobile phone, or the like. In some embodiments, the NRA user may operate the NRA device 104 to interact with the online website or the online store of the provider institution. For example, the NRA device 104 may include a web browser and/or a client application provided thereon to enable access to the provider computing system 102 over the network 110 via the online website or the online store. In some embodiments, the NRA user may establish an account (e.g., checking account, savings account, pre-paid card account, and/or the like) with the provider institution via the NRA device 104 by accessing the online website or the online store and providing various information (e.g., device information, personal information, and/or the like) and documentation (e.g., identification document, and/or the like) to the provider institution computing system 102 via the NRA device 104. However, the present disclosure is not limited thereto, and in other embodiments, the NRA device 104 may include any suitable program, application, widget, and/or the like to enable the NRA user to provide the information and/or documentation to the provider computing system 102.

In some embodiments, the NRA device 104 may include a processing circuit having a processor and memory. In various embodiments, the processor may include a general-purpose processor, an Application Specific Integrated Circuit (ASIC), one or more Field Programmable Gate Arrays (FPGAs), a Digital Signal Processor (DSP), any other suitable electronic processing components, or combinations thereof. The memory may include tangible, non-transient, volatile memory or non-volatile memory, for example, such as Random Access Memory (RAM), Read-Only Memory (ROM), Non-volatile RAM (NVRAM), Flash Memory, hard disk storage, any other suitable electronic storage medium, or combinations thereof. The memory stores instructions (e.g., data, computer code, and/or programming logic) that, when executed by the processor, controls the operations of the NRA device 104. Accordingly, the memory includes database components, object code components, script components, and/or any other type of information structure for supporting the various activities and information structures described herein.

In some embodiments, the provider computing system 102 may analyze the information and/or documentation provided via the NRA device 104 to assess a risk associated with the NRA user (or the NRA device 104), and/or to verify the identity of the NRA user. For example, in some embodiments, the provider computing system 102 may analyze device information associated with the NRA device 104 to determine whether the NRA device 104 has been compromised. In some embodiments, the provider computing system 102 may analyze the documentation and/or personal information to verify whether the NRA user is the same person claimed to be associated with the documentation and/or associated with the personal information. In some embodiments, the provider computing system 102 may determine whether the NRA user is a potential or known bad actor (e.g., fraudster, high-risk actor, sanctioned actor, or the like) and/or otherwise high risk (e.g., a politically exposed person, government official, state run enterprise, key leaders, or the like) to establish an account with the provider institution. The provider computing system 102 will be described in more detail with reference to FIG. 2.

In some embodiments, the provider computing system 102 may be communicably connected to one or more 3rd party systems 106. In some embodiments, the 3rd party systems 106 may provide access to one or more data stores (e.g., databases) associated with the 3rd party systems 106. For example, in some embodiments, the provider computing system 102 may communicate with (e.g., via API) the 3rd party systems 106 to determine whether the one or more data stores include relevant information associated with the NRA user. Each of the one or more data stores may be credible sources that are maintained by a credible entity, governmental or otherwise. For example, the one or more data stores may include, for example, one or more foreign governmental data stores (or databases), one or more domestic governmental data stores (or databases), one or more watch-list data stores (or databases), and/or the like. In some embodiments, the provider computing system 102 may provide the information and/or the documentation associated with the NRA user to the 3rd party systems 106 to query the one or more data stores for relevant information associated with the NRA user that may be used to verify the identity of the NRA user and/or assess risks associated with the NRA user.

In some embodiments, the provider computing system 102 may be communicably connected to one or more partner devices 108. The one or more partner devices 108 may be associated with one or more registered partners of the provider institution that have been authorized by the provider institution to submit applications on behalf of potential NRA customers desiring to apply for an account with the provider institution. For example, in various embodiments, the one or more registered partners may include Financial Industry Regulatory Authority (FINRA) approved US brokerage firms, but the present invention is not limited thereto, and the registered partners may be from any suitable industry that is appropriate depending on a corresponding industry of the provider institution.

In some embodiments, the partner devices 108 may communicate with the provider computing system 102 (e.g., via API) to provide a submission (e.g., a single submission or a batch submission) of one or more applications associated with one or more potential NRA customers. For example, in some embodiments, the partner devices 108 may include any one or more of a desktop computer, a laptop, a tablet, a smart phone, a mobile phone, or the like. In some embodiments, the partner devices 108 may include a processing circuit having a processor and memory. The processor and memory of the partner devices 108 may include any one or more or various suitable combinations of the kinds of processors and memory devices described above with reference to the NRA device 104. The partner devices 108 will be described in more detail with reference to FIGS. 5 and 6.

Still referring to FIG. 1, the NRA device 104, the 3rd party systems 106, and the partner devices 108 are connected to the provider computing system 102 via the communication network 110. The network 110 may be structured to enable the exchange of data, values, instructions, messages, and/or the like among the provider computing system 102 and the NRA device 104, the 3rd party systems 106, and the partner devices 108. In various embodiments, the network 110 may include any suitable wired or wireless network (e.g., a Local Area Network (LAN), a Wide Area Network (WAN), cellular communications network, and/or the like). For example, the network 110 may include Frequency Division Multiple Access (FDMA), Time Division Multiple Access (TDMA), Code Division Multiple Access (CDMA) (e.g., Evolution-Data Optimized (EVDO)), Universal Mobile Telecommunications Systems (UMTS) (e.g., Time Division Synchronous CDMA (TD-SCDMA or TDS)), Wideband Code Division Multiple Access (WCDMA), Long Term Evolution (LTE), evolved Multimedia Broadcast Multicast Services (eMBMS), High-Speed Downlink Packet Access (HSDPA), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combinations thereof, and/or the like.

Figure 2:
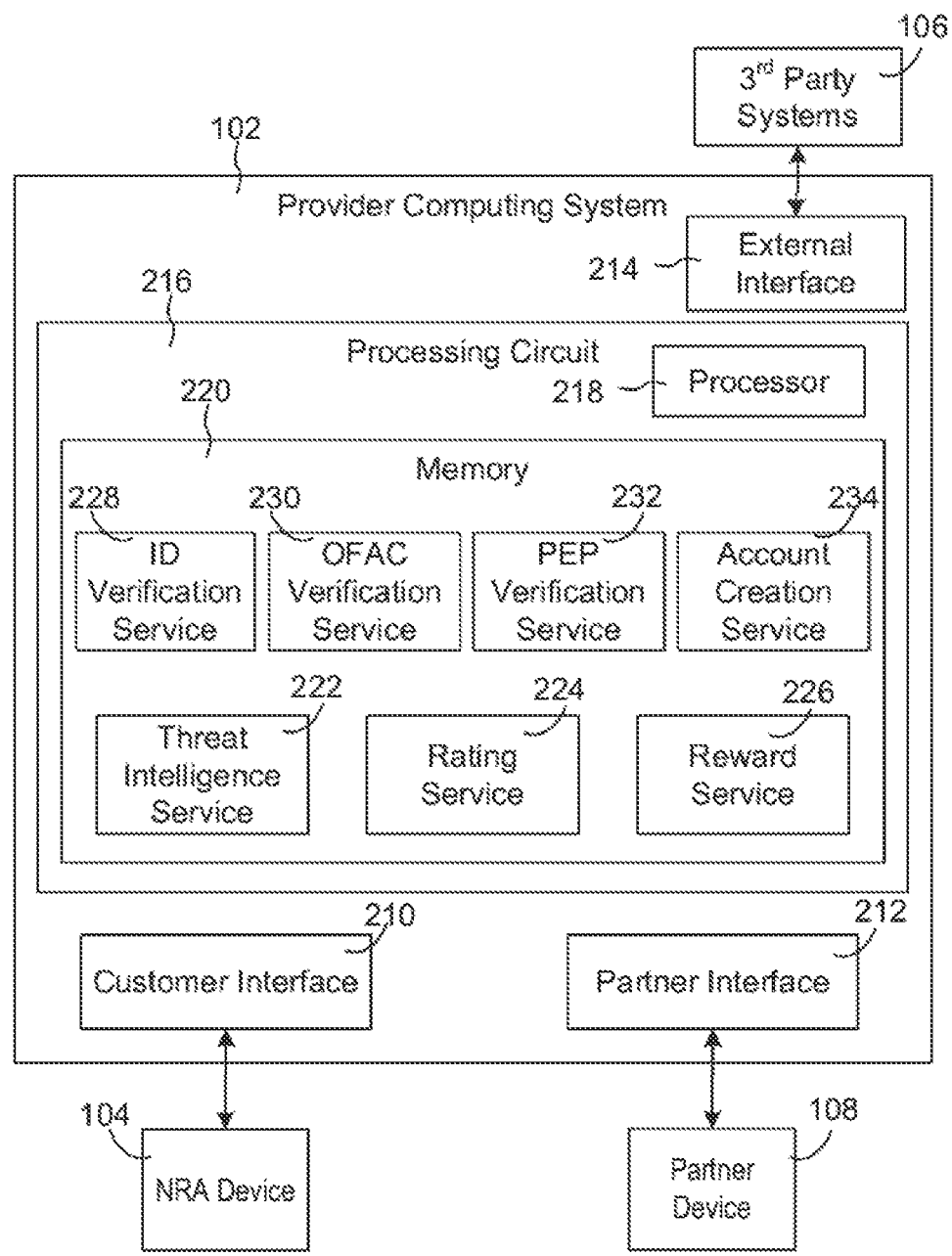
FIG. 2 is a block diagram of an example of a provider institution computing system, according to some example embodiments.

FIG. 2 is a block diagram of an example of the provider computing system 102 of FIG. 1, according to some embodiments.

Referring to FIG. 2, the provider computing system 102 includes a customer interface 210 for communicating with the NRA device 104, a partner interface 212 for communicating with the partner device 108, and an external interface 214 for communicating with the 3rd party systems 106. While FIG. 2 shows each of the customer interface 210, the partner interface 212, and the external interface 214 as separate interfaces, the present disclosure is not limited thereto, and in other embodiments, any two or more of the customer interface 210, the partner interface 212, and the external interface 214 may be a part of the same interface.

In some embodiments, the interfaces 210, 212, and 214 may be or include wired or wireless communications interfaces (e.g., jacks, antennas, transmitters, receivers, transceivers, wire terminals, and/or the like) for conducting data communications with the provider computing system 102. In various embodiments, communications via interfaces 210, 212, and 214 can be direct (e.g., local wired or wireless communications) or via the communications network 110 (e.g., a WAN, the Internet, a cellular network, and/or the like). For example, interfaces 210, 212, and 214 may include a Wi-Fi transceiver for communicating via a wireless communications network. In another example, interfaces 210, 212, and 214 may include an Ethernet card and port for sending and receiving data via an Ethernet-based communications link or network. In another example, one or more of interfaces 210, 212, and 214 may include cellular or mobile phone communications transceivers. In various embodiments, the interfaces 210, 212, and 214 may support various protocols (e.g., TCP/IP, User Datagram Protocol UDP, Hypertext Transfer Protocol HTTP, Internet Message Access Protocol IMAP, Simple Mail Transfer Protocol SMTP, and/or the like) and/or data communication interfaces (e.g., Application Program Interface API, Web Services, and/or the like) for facilitating data communications with the NRA device 104, the partner devices 108, and the 3rd party systems 106.

In some embodiments, the provider computing system 102 includes a processing circuit 216 including a processor (e.g., one or more processors) 218 and memory (e.g., one or more memory devices) 220. The processing circuit 216 may be communicably connected to the customer interface 210, the partner interface 212, and/or the external interface 214, such that the processing circuit 216 and the various components thereof can send and receive data via interfaces 210, 212, and 214.

The processor 218 may be implemented with a general-purpose processor, an ASIC, one or more FPGAs, a DSP, a group of processing components that are distributed over various geographic locations or housed in a single location or device, or other suitable electronic processing components. The memory (e.g., memory device, memory unit, one or more memory devices, storage device, or the like) 220 may be implemented with RAM, NVRAM, ROM, Flash Memory, hard disk storage, cloud storage, and/or other suitable electronic storage devices. The memory 220 stores data and/or computer code for facilitating at least some of the various processes described herein. The memory 220 includes tangible, non-transient, volatile or non-volatile memory. The memory 220 may include database components, object code components, script components, and/or any other type of information structure for supporting the various activities and information structures described in the present application.

According to an example embodiment, the memory 220 is communicably connected to processor 218 via processing circuit 216, and includes computer code for executing (e.g., by processing circuit 216 and/or processor 218) one or more processes described herein. For example, the memory 220 stores instructions or programming logic that, when executed by the processor 218, controls the operations of the provider computing system 102. In some embodiments, the processor 218 and the memory 220 may form or be part of various processing circuits in the provider computing system 102.

Still referring to FIG. 2, in some embodiments, memory 220 includes a threat intelligence service 222, a rating service 224, a reward service 226, an ID verification service 228, an Office of Foreign Assets Control (OFAC) verification service 230, a Politically Exposed Person (PEP) verification service 232, and an account creation service 234. Services 222 to 234 may be configured to receive inputs from the NRA device 104, the partner device 108, the 3rd party systems 106, and other data sources, determine actions for the provider computing system 102 based on the inputs, generate control signals based on the actions, and provide the generated control signals to the interfaces 210, 212, and 214 for communicating with the NRA device 104, the partner device 108, and the 3rd party systems 106, respectively. For example, based on the control signals, the interfaces 210, 212, and 214 may determine a page (e.g., a webpage), a query (e.g., a database query), a request (e.g., an API), a message (e.g., response message), or the like to communicate with the NRA device 104, the partner device 108, and/or the 3rd party systems 106. A brief overview of some of the functions performed by each of the services 222 to 234 will be described in the following paragraphs, followed by more detailed description with reference to FIGS. 3 through 6.

In some embodiments, the threat intelligence service 222 may analyze communications and/or activities of the NRA device 104 to determine various security risks or potential threats associated with the NRA device 104. For example, in some embodiments, the threat intelligence service 222 may analyze session information with the NRA device 104 to determine whether the session originated from a blocked or sanctioned geographical location (e.g., a sanctioned country). In other embodiments, the threat intelligence service 222 may analyze geolocation data (e.g., global positioning system (GPS) data) provided by the NRA device 104 to determine a geographical location of the NRA device 104. In some embodiments, the threat intelligence service 222 may analyze various activities of the NRA device 104 to determine whether the NRA device 104 has been compromised. For example, in some embodiments, the threat intelligence service 222 may analyze applications that have been downloaded, installed, or otherwise accessed by the NRA device 104 to determine, for example, whether any malware has been installed on or otherwise infected the NRA device 104. In some embodiments, the threat intelligence service 222 may generate a threat recommendation based on the analysis, which may be used to determine a page flow to present to the NRA user via the NRA device 104.

In some embodiments, the rating service 224 and the reward service 226 may control a throughput of the applications submitted by a registered partner using the partner device 108, and may monitor and/or quality control the submissions. For example, in some embodiments, the rating service 224 may restrict (or limit) the number of applications that may be submitted (e.g., single submission or batch submission) by a corresponding registered partner (e.g., via the partner device 108) at a given time based on a flow rate rating for the corresponding registered partner. In some embodiments, the reward service 226 may calculate a reward for the corresponding registered partner according to the submissions to adjust the flow rate rating for the corresponding partner. For example, in some embodiments, the reward service 226 may calculate the reward for the corresponding registered partner based on a ratio of the number of submitted applications to the number of approved applications. In some embodiments, the reward service 226 may communicate with the rating service 224 to adjust the flow rate rating for the corresponding partner based on the reward.

In some embodiments, the ID verification service 228 may verify the identity (ID) of the NRA user or the potential NRA customer (collectively, the "NRA applicant"). For example, in some embodiments, the ID verification service 228 may analyze one or more identification documentation associated with the NRA applicant that is provided via the NRA device 104 or via the partner device 108. In some embodiments, the one or more identification documentation may include, for example, at least a local foreign government-issued identification document (or a local foreign government-issued ID) associated with the NRA applicant.

The local foreign government-issued ID as used in this specification refers to a foreign government-issued photo identification document (e.g., a national identity document) that includes a unique identifier assigned to the NRA applicant. The local foreign government-issued ID generally displays (e.g., shows) some basic personal information of the NRA applicant (e.g., name, date of birth (DOB), sex, and/or the like) on a face (or surface) of the ID. Unlike a foreign passport, which may be obtained only upon request or upon travel authorization, the local foreign government-issued ID may be compulsory to possess (or obtain) for at least all residents (e.g., citizens) of the foreign state (e.g., the foreign country) who have reached a particular age, and/or in order to obtain basic necessities and services (e.g., electricity, water, phone, and/or the like) in the foreign state. Some non-limiting examples of a local foreign government-issued ID are China's Resident Identity Card, Taiwan's National Identification Card, India's Aadhaar Identity Card, South Korea's Identity Card, and/or the like.

In some embodiments, the ID verification service 228 may communicate with the one or more foreign governmental data stores associated with the 3rd party systems 106 to verify the identity of the NRA applicant based on the local foreign government-issued ID provided by the NRA applicant. For example, in some embodiments, while the local foreign government-issued ID may display (e.g., show) some basic personal information (e.g., name, DOB, sex, and/or the like), the local foreign government-issued ID (e.g., the unique identifier) may be tied to or otherwise associated with other identifiable personal information that cannot be identified directly from the ID itself, for example, such as an address, telephone number (e.g., mobile phone number), and/or the like. For example, in some embodiments, the provider computing system 102 may solicit a telephone number (e.g., mobile number) from the NRA applicant, and may compare the solicited telephone number with a telephone number (e.g., a mobile number) associated with the unique identifier of the local foreign government-issued ID and stored in the one or more foreign governmental data stores. In some embodiments, the ID verification service 228 may communicate with the one or more foreign governmental data stores (e.g., via the 3rd party systems 106) to identify and/or compare the identifiable personal information associated with the local foreign government-issued ID with information solicited from the NRA applicant (e.g., via an online questionnaire). In some embodiments, the ID verification service 228 may generate an ID verification status based on the comparison, and may provide the ID verification status to the account creation service 234.

In some embodiments, the OFAC verification service 230 may communicate with the one or more domestic governmental data stores to determine whether the NRA applicant and/or the foreign state of the NRA applicant are engaged in activities that may threaten the national security and/or economic well-being of the domestic state of the provider institution. For example, in some embodiments, the name and/or residence (e.g., citizenship) of the NRA applicant may be cross-referenced with names and/or foreign states identified from the one or more domestic governmental data stores to determine whether the NRA applicant and/or the resident foreign state of the NRA applicant are identified in the one or more domestic governmental data stores. In some embodiments, the OFAC verification service 230 generates a risk score (e.g., a first score component) corresponding to a probability that the names and/or foreign states identified in the one or more domestic governmental data stores correspond to the NRA applicant and/or the resident foreign state of the NRA applicant. In some embodiments, the OFAC verification service 230 provides the risk score to the account creation service 234.

For convenience, the one or more domestic governmental data stores is described as being associated with OFAC, which is an official authority within the United States Treasury Department, such that the domestic state of the provider institution corresponds to the United States of America. However, the present disclosure is not limited thereto, and in other embodiments, the domestic state may correspond to any suitable country such that the one or more domestic governmental data stores may be associated with a similar official authority (e.g., as OFAC) in the corresponding country of the domestic state.

In some embodiments, the PEP verification service 232 may communicate with the one or more watch-list data stores to determine whether the NRA applicant is otherwise unqualified to establish an account with the provider institution of the domestic state. For example, in some embodiments, the name of the NRA applicant may be cross-referenced with names identified from the one or more watch-list data stores to determine whether the NRA applicant is identified in the one or more watch-list data stores. In some embodiments, the one or more watch-list data stores may include, for example, names of politically exposed persons (and their affiliates, family members, and/or the like) that are maintained by various governmental entities (e.g., domestic and/or foreign), private entities, public entities, financial institutions, and/or the like. The one or more watch-list data stores may include, for example, governmental data stores (domestic and/or foreign), publically accessible data stores, privately maintained data stores, and/or the like. In some embodiments, the PEP verification service 232 generates a compliance score (e.g., a second score component) corresponding to a probability that one of the names identified in the one or more watch-list data stores corresponds to the NRA applicant. In some embodiments, the PEP verification service 232 provides the compliance score to the account creation service 234.

In some embodiments, the account creation service 234 may determine whether the NRA applicant's application (or the NRA applicant) is in an approved, denied, or pending state based on the recommendation provided by the threat intelligence service 222, the ID verification status provided by the ID verification service 228, the risk score provided by the OFAC verification service 230, and/or the compliance score provided by the PEP verification service 232. For example, in some embodiments, if the recommendation provided by the threat intelligence service 222 indicates that the session is insecure (e.g., established from a blocked or sanctioned country) and/or the NRA device 104 has been compromised (e.g., by malware, spyware, and/or the like), the threat intelligence service 222 may automatically block the session and/or the NRA device 104 and/or the account creation service 234 may assign a denied state (e.g., a denied flag) to the application. In this case, the threat intelligence service 222 and/or the customer interface 210 may block or otherwise prevent the NRA user from proceeding further through the onboarding process (e.g., a normal page flow) as the session is blocked and/or the NRA device 104 has been compromised.

In some embodiments, if any one or more of the ID verification status, the risk score, and/or the compliance score indicates that the NRA applicant has failed a corresponding check (or verification), then the account creation service 234 may automatically assign a pending state (e.g., a pending flag) to the application, such that the application is flagged for further review (e.g., by a case manager or other provider institution employee). On the other hand, if all of the checks (e.g., by the threat intelligence service 222, the ID verification service 228, the OFAC verification service 230, and the PEP verification service 232) pass or are approved, then the account creation service 234 may automatically approve the NRA applicant, and may create an account for the NRA applicant with the provider institution.

Figure 3:
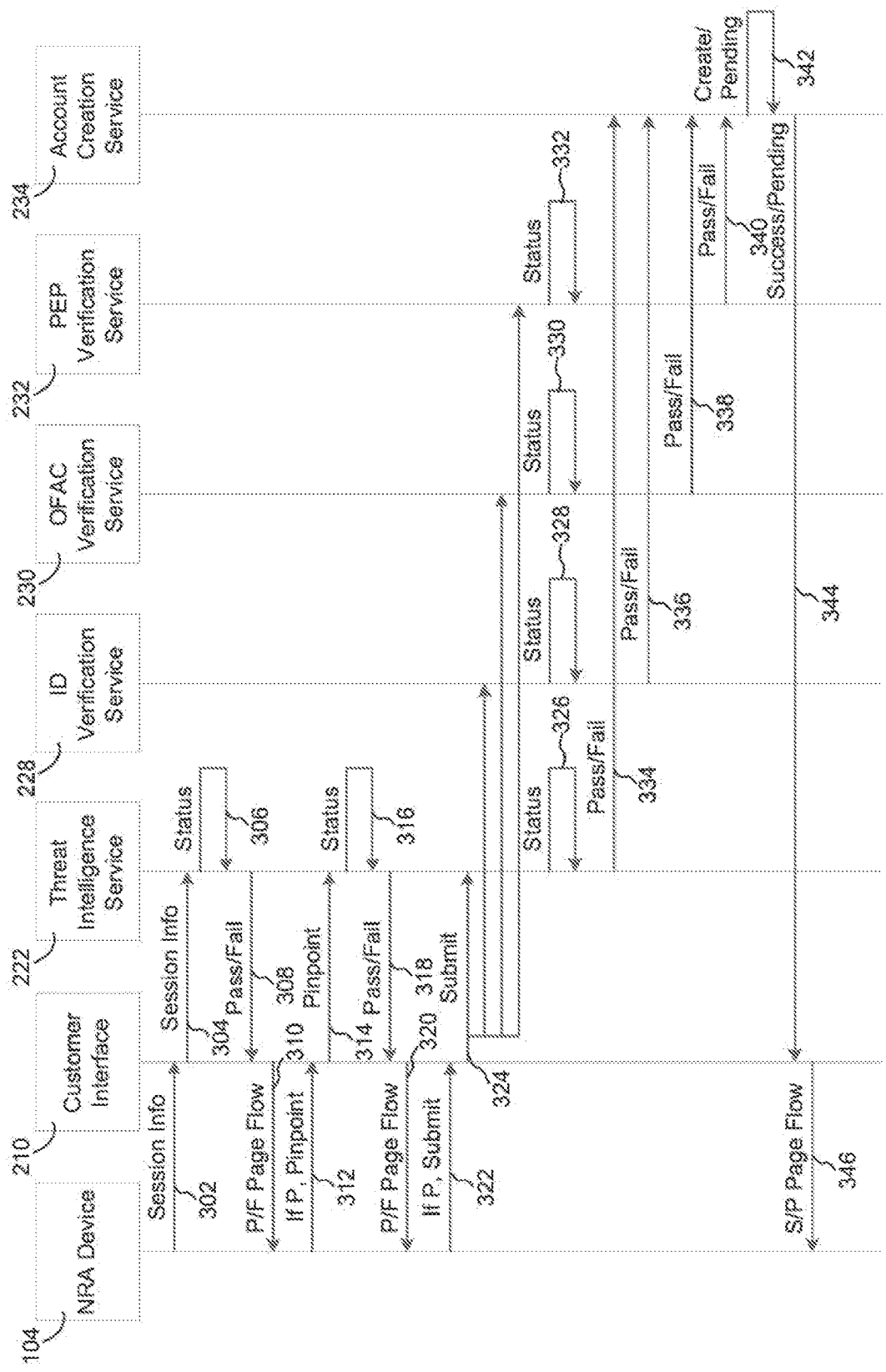
FIG. 3 is a signaling diagram of a method for remotely verifying the identity of non-resident aliens, according to some example embodiments.

FIG. 3 is a signaling diagram of a method for remotely verifying the identity of non-resident aliens, according to some example embodiments. FIGS. 4A-4D are example flow diagrams of a method for remotely verifying the identity of non-resident aliens, according to some example embodiments.

Figure 4A:
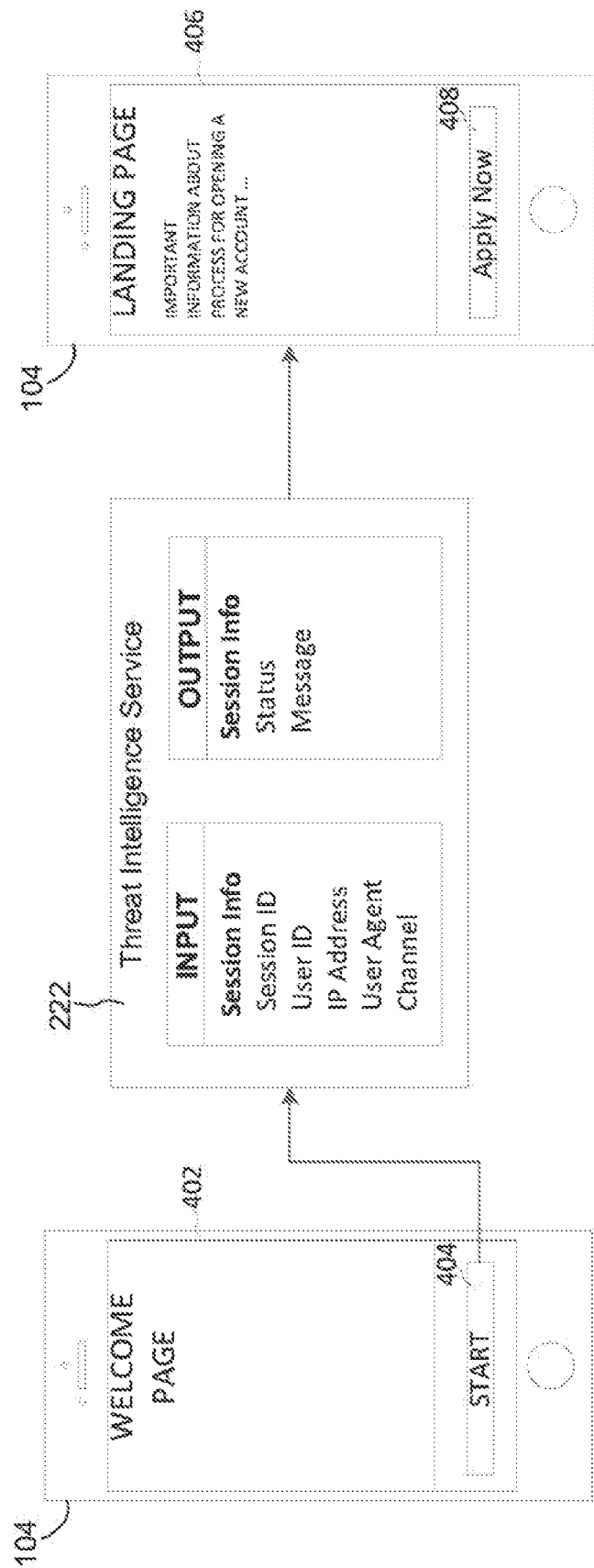
FIGS. 4A-4D are example flow diagrams of a method for remotely verifying the identity of non-resident aliens, according to some example embodiments.

First referring to FIGS. 3 and 4A, in some embodiments, the NRA user may use the NRA device 104 to establish a communication session with the provider computing system 102 and may provide session information to the provider computing system 102 at operation 302. For example, in some embodiments, the NRA device 104 may navigate to a welcome page 402 of the customer interface 210 to provide the session information at operation 302. In various embodiments, the session information may be provided, for example, when the NRA device 104 requests (e.g., HTTP GET) the welcome page 402, and/or in response to the NRA user selecting a control (e.g., a start button 404) from the welcome page 402 to request a next page (e.g., a landing page 406). In some embodiments, the session information may include, for example, an IP address (e.g., a source IP address), a session ID, a user ID, a user agent, channel information (e.g., web or mobile), and/or the like. In some embodiments, in response to receiving the session information at operation 302, the customer interface 210 may provide the session information to the threat intelligence service 222 at operation 304.

In some embodiments, the threat intelligence service 222 may analyze the session information to determine a status at operation 306. For example, in some embodiments, the threat intelligence service 222 may analyze the IP address to determine a geographical location of a source from where the communication session was established. In some embodiments, the threat intelligence service 222 may determine whether the source geographical location is a known hotspot for fraudsters or for fraudulent activities. For example, in some embodiments, the threat intelligence service 222 may compare the IP address with a list of sanctioned (or blocked) IP addresses to determine whether the source geographical location corresponds to a sanctioned location (e.g., a sanctioned country, region, or the like). In some embodiments, if the source geographical location is determined to be a known hotspot (e.g., a sanctioned location), then the threat intelligence service 222 may block the IP address, such that the NRA device 104 is prevented from proceeding further into the flow. For example, in some embodiments, the threat intelligence service 222 (or the customer interface 210) may add an entry to a black list (e.g., a domain name system based list DNSBL) to block the IP address, but the present disclosure is not limited thereto, and the IP address may be blocked using any suitable methods.

In some embodiments, the threat intelligence service 222 may provide the status (e.g., pass P or fail F) to the customer interface 210 at operation 308. In some embodiments, the status may include a message (e.g., block or allow) indicating whether or not the IP address has been blocked (or should be blocked), but the present disclosure is not limited thereto. The customer interface 210 may then provide an appropriate page flow to the NRA device 104 depending on the status or message provided from the threat intelligence service 222 at operation 310. For example, if the IP address has been blocked (e.g., fail F), the customer interface 210 may provide a stop page (e.g., a sorry page, an error page, or the like) to the NRA device 104 at operation 310, such that the NRA device 104 is prevented from proceeding further into the flow. Accordingly, the status check at operation 306 may prevent a fraudster from committing or furthering fraud on the provider institution, and/or may prevent an unsuspecting NRA user from providing sensitive information to the provider computing system 102 over an insecure communication session. On the other hand, if the status or message indicates that the IP address has been allowed (e.g., pass P), then the customer interface 210 may provide a landing page 406 to enable the NRA device 104 to proceed further into the flow at operation 310.

Figure 4B:
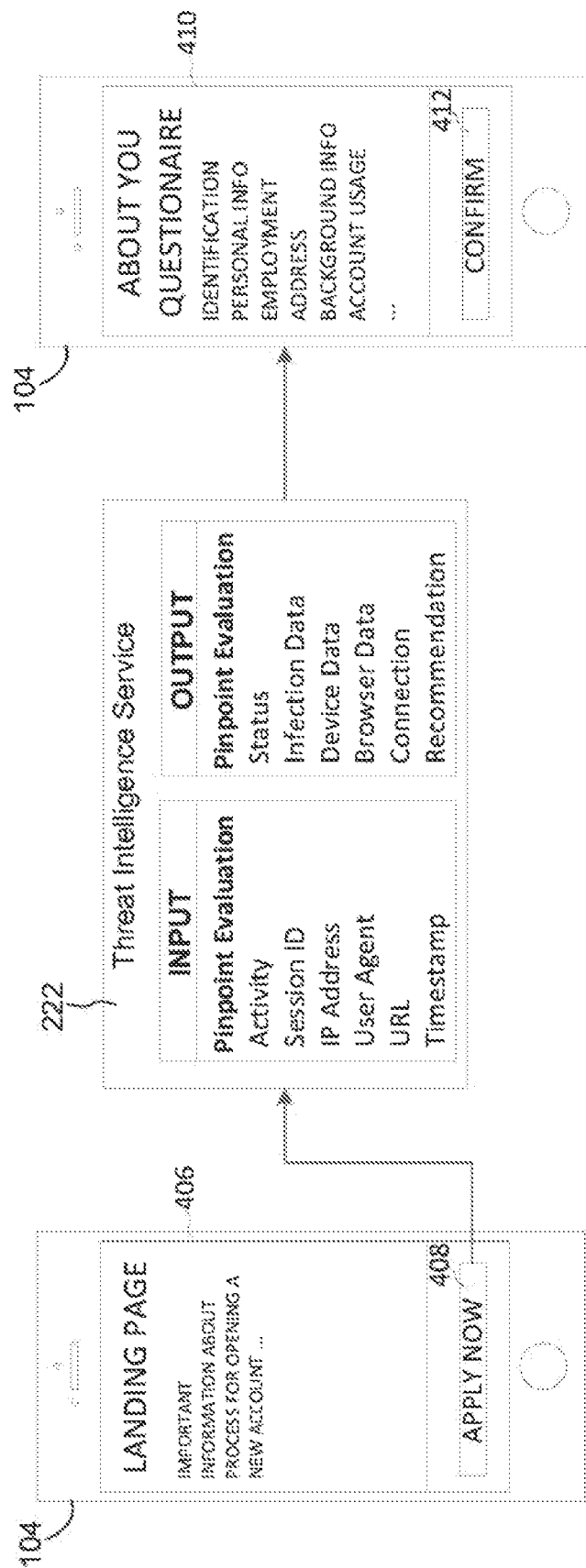

Referring now to FIGS. 3 and 4B, if the customer interface 210 provides the landing page 406 at operation 310 such that the NRA device 104 navigates to the landing page 406, the NRA device 104 may provide pinpoint information (e.g., device information) to the customer interface 210 at operation 312. In various embodiments, the pinpoint information may be provided, for example, when the NRA device 104 requests the landing page 406, and/or in response to the NRA user selecting a control (e.g., an apply now button) 408 from the landing page 406 to request a next page (e.g., one or more questionnaire pages 410).

In some embodiments, in response to receiving the pinpoint information at operation 312, the customer interface 210 may provide the pinpoint information to the threat intelligence service 222 at operation 314. In some embodiments, the pinpoint information may include, for example, various information associated with the NRA device 104. For example, in some embodiments, the pinpoint information may include one or more activity information, a session ID, an IP address, a user agent, a Uniform Resource Locator (URL), a timestamp, and/or the like. In some embodiments, the activity information may provide various activity data associated with the NRA device 104. For example, the activity information may indicate download information, login information, transaction information, in session information, and/or the like. In some embodiments, the user agent may provide various information associated with the NRA device 104. For example, the user agent may indicate a browser type, device type, operating system, and/or the like associated with the NRA device 104.

In some embodiments, the threat intelligence service 222 may analyze the pinpoint information to determine a status and/or a recommendation at operation 316. For example, in some embodiments, the threat intelligence service 222 may analyze the pinpoint information (e.g., device information) to determine whether the NRA device 104 may be compromised. For example, in some embodiments, the threat intelligence service 222 may identify infection data, device data, browser data, connection data, and/or the like from the pinpoint information to generate the status and/or the recommendation. In some embodiments, the infection data may include, for example, malware name, whether the malware is targeted or not (e.g., whether the malware is active in session or targeting the application), a risk score associated with the malware indicating a level of risk for the application (e.g., web site) from the malware, a timestamp, and/or the like. In some embodiments, the device data may include, for example, screen width, screen height, screen touch, client time zone, first access, first time, last access, last time, client language, platform, CPU, OS, user agent, and/or the like. In some embodiments, the browser data may include, for example, browser type, browser version, acceptable languages, and/or the like. In some embodiments, the connection information may include, for example, IP address, IP class, internet service provider type, country code, region, city, post code, time zone, longitude, latitude, and/or the like.

In some embodiments, the threat intelligence service 222 may analyze, for example, the activity information and/or the user agent information to determine whether the device has been compromised. For example, the threat intelligence service 222 may determine from the activity information and/or the user agent information the applications downloaded on or otherwise accessed by the NRA device 104 to determine any infection data associated with the type of NRA device 104. In some embodiments, the threat intelligence service 222 may compare the applications downloaded on or otherwise accessed by for the NRA device 104 with a list of applications according to a type of the NRA device 104 that are known to be infected with malware. In some embodiments, the threat intelligence service 222 may analyze the infection data to determine whether the NRA device 104 is likely compromised by the malware, for example. However, the present disclosure is not limited thereto, and any suitable device information and/or combination of device information that may be determined through data communications with the NRA device may be analyzed to determine whether the NRA device is compromised.

In some embodiments, if the threat intelligence service 222 determines that the NRA device 104 has been compromised (e.g., likely infected by malware), the threat intelligence service 222 (or the customer interface 210) may block the NRA device 104, such that the NRA device 104 is prevented from proceeding further into the flow. For example, in some embodiments, the threat intelligence service 222 (or the customer interface 210) may add an entry to a black list (e.g., a domain name system based list DNSBL) to block an IP address associated with the NRA device 104, but the present disclosure is not limited thereto, and the NRA device 104 may be blocked using any suitable methods.

In some embodiments, the threat intelligence service 222 may provide the status (e.g., pass P or fail F) to the customer interface 210 at operation 318. In some embodiments, the status may include a recommendation (e.g., block or allow) indicating whether or not the NRA device 104 should be allowed to proceed through the flow, but the present disclosure is not limited thereto. The customer interface 210 may then provide an appropriate page flow to the NRA device 104 depending on the status or recommendation provided from the threat intelligence service 222 at operation 320. For example, if the NRA device 104 has been blocked (e.g., fail F), the customer interface 210 may provide the stop page to the NRA device 104 at operation 320, such that the NRA device 104 is prevented from proceeding further into the flow. Accordingly, the pinpoint (or device information) check at operation 316 may prevent a fraudster from committing or furthering fraud on the provider institution, and/or may prevent an unsuspecting NRA user from providing sensitive information to the provider computing system 102 using the compromised NRA device 104.

On the other hand, if the status or recommendation indicates that the NRA device 104 has been allowed (e.g., pass P), then the customer interface 210 may provide the one or more questionnaire pages 410 to solicit information from the NRA user to apply for an account with the provider institution. For example, in some embodiments, the one or more questionnaire pages 410 may enable the NRA user to provide personal and/or other sensitive information to the provider computing system 102 via the NRA device 104. For example, the one or more questionnaire pages 410 may solicit identification information, personal information, employment information, address information, background information, expected account usage information, and/or the like.

In some embodiments, the identification information may include information associated with a local foreign government-issued ID, for example, such as citizenship, name (e.g., in native language and/or converted to a universal encoding (e.g., UTF) or a language used in the domestic state such as English, for example), date of birth, and/or unique ID number (e.g., the unique identifier of the local foreign government-issued ID). The personal information may include, for example, gender, current country of legal residence, phone number (e.g., mobile number), and/or the like. The employment information may include, for example, occupation, years of employment, position, company name, and/or the like. The address information may include, for example, current residence address (e.g., country, province/city/district, detailed address, and/or the like) and/or mailing address. The background information may include, for example, information relating to whether the NRA user and/or any family members are a senior political figure (SPF) or a politically exposed person (PEP). In some embodiments, the account usage information may include, for example, primary purpose for the account, primary source of income, expected account usage information (e.g., ingress and egress of funds), and/or the like. However, the present disclosure is not limited to the examples of the information solicited via the one or more questionnaire pages 410.

In some embodiments, the solicited information, including the identification information, may be manually entered by the NRA user via the NRA device 104. In other embodiments, at least the identification information may be provided by the NRA user using various different methods. For example, in some embodiments, the NRA user may be provided various options to provide the identification information, for example, such as manually entering the identification information associated with the local foreign government-issued ID using an input device (e.g., a keyboard, mouse, touch screen, and/or the like) associated with the NRA device 104, uploading a picture of the local foreign government-issued ID from internal or external file storage associated with the NRA device 104, and/or manipulating a camera device associated with the NRA device 104 to capture one or more images of the local foreign government-issued ID.

Figure 4C:
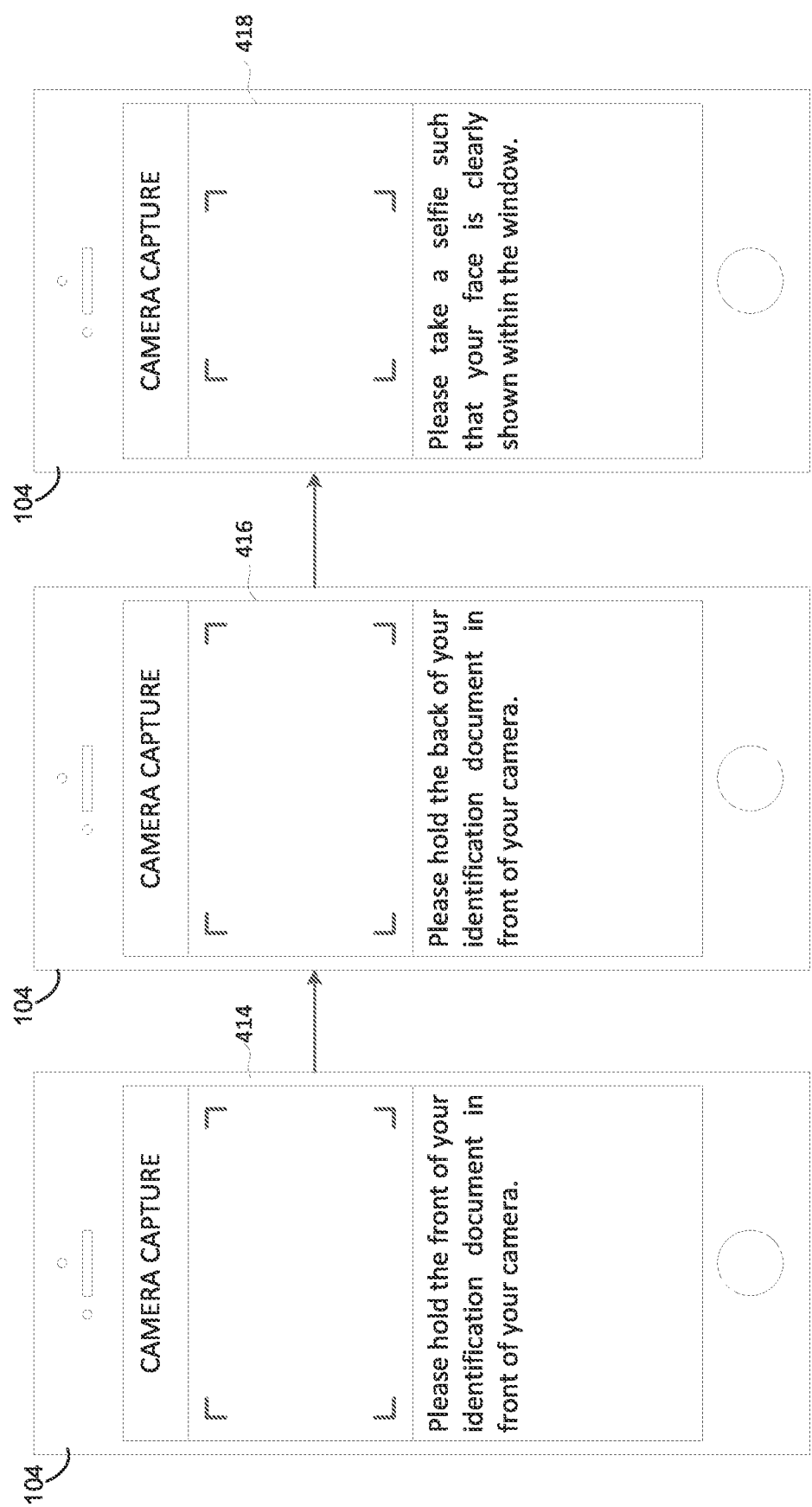

For example, referring now to FIG. 4C, an example flow diagram of a method for providing the identification information is shown, according to an example embodiment. In some embodiments, the one or more questionnaire pages 410 may include one or more camera capture pages 414, 416, and 418 to enable the NRA user to provide the identification information by manipulating a camera device associated with the NRA device 104. For example, in some embodiments, a first camera capture page 414 may be provided to enable the NRA user to capture an image of the front of the local foreign government-issued ID by arranging the front of the local foreign government-issued ID within a view window of the camera device. In some embodiments, a second camera capture page 416 may be provided to enable the NRA user to capture an image of the back of the local foreign government-issued ID by arranging the back of the local foreign government-issued ID within a view window of the camera device.

In some embodiments, the information contained on the local foreign government-issued ID may be automatically recognized from one or more of the images of the local foreign government-issued ID using computer vision. For example, in some embodiments, the ID verification service 228 may automatically extract the identification information from the one or more images of the local foreign government-issued ID using a suitable optical character recognition (OCR) method. In some embodiments, the ID verification service 228 may use OCR to automatically extract, for example, a unique identifier associated with the local foreign government ID, a name of the NRA user as shown on the local foreign government ID, citizenship of the NRA user, gender, a photo of the NRA user, and/or the like.

Still referring to FIG. 4C, in some embodiments, the one or more questionnaire pages 410 may optionally further include a third camera capture page 418 to enable the NRA user to capture a selfie that may be compared with the photo of the NRA user as shown on the local foreign government ID. For example, in some embodiments, the NRA user may be provided the third camera capture page 418 to arrange a head-shot of the NRA user within a view window of the camera device. In this case, in some embodiments, the ID verification service 228 may further verify the identity of the NRA user by comparing the photo of the NRA user as shown on the local foreign government ID with the selfie photo of the NRA user. For example, in some embodiments, the ID verification service 228 may compare the photo of the NRA user as shown on the local foreign government ID with the selfie photo of the NRA user using a suitable object detection and comparison computer vision method. However, the present invention is not limited thereto, and in some embodiments, the third camera capture page 418 may be omitted.

Figure 4D:
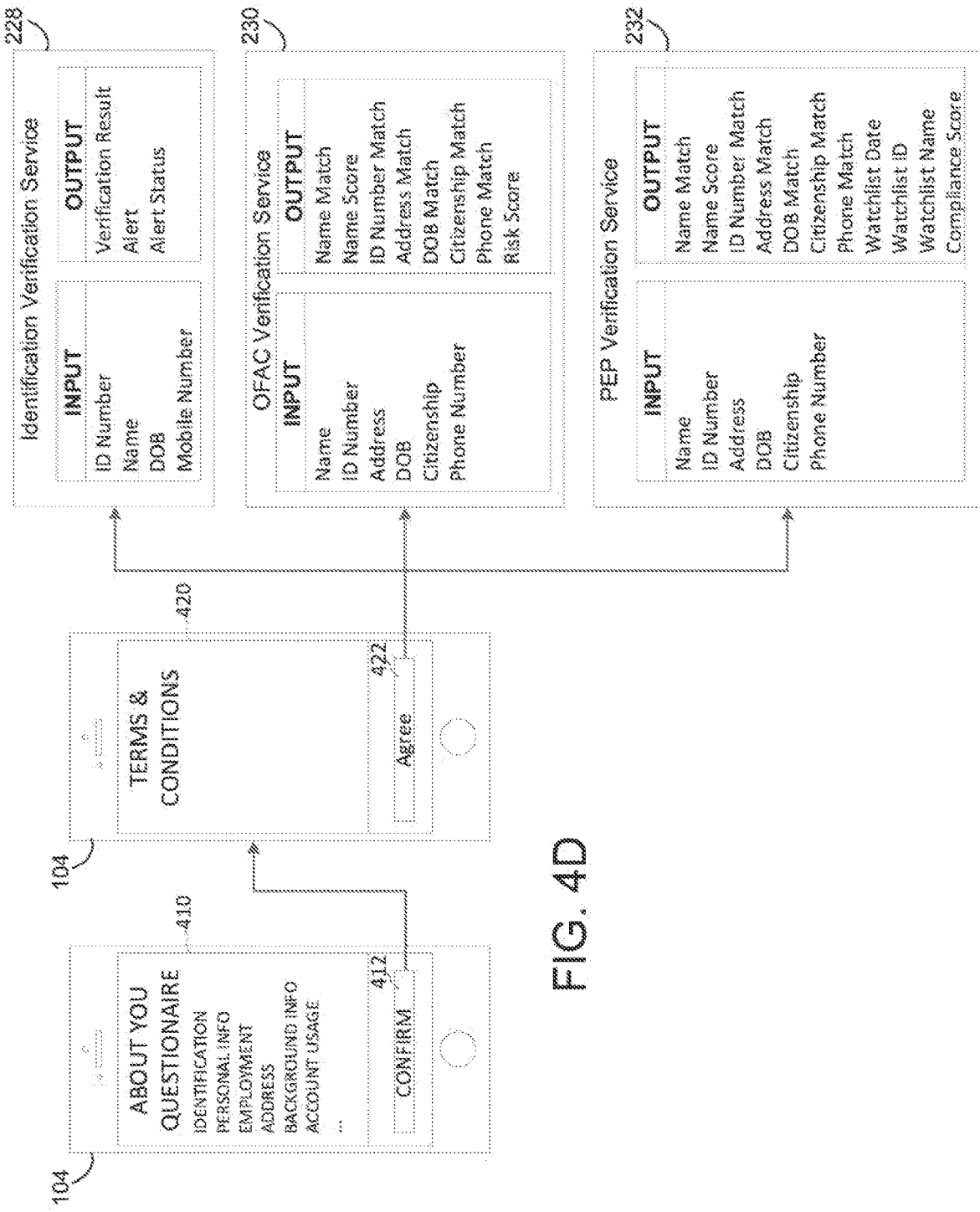

Referring now to FIGS. 3 and 4D, in some embodiments, after providing the information from the one or more questionnaire pages 410, the NRA user may confirm the information by selecting an action (e.g., a confirm button control 412) and may be provided a terms and conditions page 420. Upon accepting the terms and conditions (e.g., by selecting an agree button control 422), the application is submitted to the customer interface 210 at operation 322. In some embodiments, at operation 324, the customer interface 210 may provide various information from the submitted application to the threat intelligence service 222, the ID verification service 228, the OFAC verification service 230, and the PEP verification service 232 to perform the various checks (e.g., verifications).

For example, in some embodiments, in response to the NRA user selecting the agree control 422 on the terms and conditions page 420 (e.g., the submit operation 322), the threat intelligence service 222 may receive the session information and/or pinpoint information at operation 324 to again check the session information and/or the pinpoint information at operation 326, and may provide the status (e.g., pass/fail) of the check(s) to the account creation service 234 at operation 334. However, the present disclosure is not limited thereto, and in other embodiments, any one of or both of the threat intelligence checks may be omitted when the application is submitted. In still other embodiments, the threat intelligence service 222 may be invoked each time a new page is requested or submitted within the application page flow to check the session information and/or the device information at each page within the page flow.

In some embodiments, the ID verification service 228 may verify the identity of the NRA user at operation 328. For example, in some embodiments, the ID verification service 228 may query the one or more foreign governmental data stores (e.g., via the 3rd party systems 106) based on the unique ID number associated with the local foreign government-issued ID. In some embodiments, as a result of the query, the ID verification service 228 may identify various personal information associated with the NRA user stored in the one or more foreign governmental data stores according to the unique ID number. In some embodiments, the ID verification service 228 may compare the various personal information resulting from the query with various information provided by the NRA user via the one or more questionnaire pages 410. For example, In some embodiments, the ID verification service 228 may compare a name, DOB, unique identification number, and a mobile number resulting from the query with a name, DOB, unique identification number, and a mobile number provided by the NRA user and/or as shown on the local foreign government ID.

However, the present disclosure is not limited thereto, and in other embodiments, the ID verification service 228 may compare at least the name and some other personal information resulting from the query that may not be determined from the face of the local foreign government-issued ID of the NRA user. For example, in some embodiments, the ID verification service 228 may compare at least the name and the mobile number resulting from the query with the name and the mobile number provided by the NRA user. In this case, the ID verification service 228 may determine that the NRA user has knowledge of information that would be reasonably known to the person or entity associated with the local foreign government-issued ID, because the mobile telephone number is not shown on the face of the local foreign government-issued ID. However, the present disclosure is not limited thereto, and any suitable information resulting from the query may be compared with information solicited from the NRA user that may not be determined from the face of the local foreign government-issued ID. In some embodiments, the ID verification service 228 may provide a status (e.g., pass/fail) to the account creation service 234 at operation 336. In some embodiments, the status may include, for example, a result (e.g., verified, not verified, attention, or the like) of the ID verification check.

In some embodiments, the OFAC verification service 230 may determine whether the NRA user is a threat or potential threat at operation 330. For example, in some embodiments, the OFAC verification service 230 may query the one or more domestic governmental data stores (e.g., via the 3rd party systems 106) based on various information provided by the NRA user and/or shown on the local foreign government-issued ID to identify one or more attributes (e.g., domestic data) stored in the one or more domestic governmental data stores that may correspond to the NRA user. For example, in some embodiments, the OFAC verification service 230 may compare the name, ID number, address, DOB, citizenship, and/or the like provided by the NRA user (and/or as shown on the local foreign government ID) with the name attributes, ID number attributes, address attributes, DOB attributes, citizenship attributes, and/or the like stored on the one or more domestic governmental data stores.

In more detail, in some embodiments, the OFAC verification service 230 may compare the name of the NRA user with the name attributes stored in the one or more domestic governmental data stores to identify a name match, the name match being a name attribute that is similar to or the same as the name of the NRA user. The OFAC verification service 230 may generate a name score corresponding to a probability that the name of the NRA user is the same as the name attribute identified in the name match. In some embodiments, the OFAC verification service 230 may compare the ID number associated with the NRA user (e.g., the unique identifier shown on the local foreign government ID) with ID number attributes stored in the one or more domestic governmental data stores to identify an ID match, the ID match being an ID number attribute that is similar to or the same as the ID number of the NRA user. The OFAC verification service 230 may generate an ID score based on a comparison of an input value (e.g., the ID number input by the NRA user or as shown on the local foreign government ID) and a list value (e.g., the ID number identified in the one or more domestic governmental data stores). In some embodiments, the OFAC verification service 230 may compare the address of the NRA user with the address attributes stored in the one or more domestic governmental data stores to identify an address match, the address match being an address attribute that is similar to or the same as the address of the NRA user. The OFAC verification service 230 may generate an address score based on a comparison of an input value (e.g., the address input by the NRA user) and a list value (e.g., the address identified in the one or more domestic governmental data stores). In some embodiments, the OFAC verification service 230 may compare the DOB of the NRA user with the DOB attributes stored in the one or more domestic governmental data stores to identify a DOB match, the DOB match being a DOB attribute that is similar to or the same as the DOB of the NRA user. The OFAC verification service 230 may generate a DOB score based on a comparison of an input value (e.g., the DOB input by the NRA user) and a list value (e.g., the DOB identified in the one or more domestic governmental data stores). In some embodiments, the OFAC verification service 230 may compare the citizenship of the NRA user with the citizenship attributes stored in the one or more domestic governmental data stores to identify a citizenship match, the citizenship match being a citizenship attribute that is similar to or the same as the citizenship of the NRA user. The OFAC verification service 230 may generate a citizenship score based on a comparison of an input value (e.g., the citizenship input by the NRA user) and a list value (e.g., the citizenship identified in the one or more domestic governmental data stores).

For example, in some embodiments, the OFAC verification service 230 may categorize each of the name match, the ID match, the address match, the DOB match, the citizenship match, and/or the like into various matching categories to generate the corresponding scores. For example, in some embodiments, each of the name match, the ID match, the address match, the DOB match, and the citizenship match may be categorized into one of an exact match category, a fuzzy match category, an enhanced match category, and/or a no match category. The exact match category may correspond to an attribute of the NRA user that is an exact match to an attribute stored in the one or more domestic data stores. The fuzzy match category may correspond to an attribute of the NRA user that is reasonably close (e.g., one or two missing letters, switched letters, switched words, and/or the like) to an attribute stored in the one or more domestic data stores, for example, based on common scenarios (e.g., misspelling, additional string, additional substring, and/or the like). The enhanced match category may correspond to an attribute of the NRA user that is different or not similar enough to the attributes stored in the one or more domestic data stores, such that other attribute matches should be considered. For example, in some embodiments, when a match is categorized into the enhanced match categories, it may indicate that other attribute matches (e.g., a primary attribute match such as name or the like) are close enough that the differences in the corresponding attribute match do not warrant a no match categorization. The no match category may correspond to an attribute of the NRA user that is not a match to attributes stored in the one or more domestic data stores, and at least one of the other attributes also do not match. In some embodiments, the corresponding scores may be generated based on the matching categories.

In some embodiments, the OFAC verification service 230 may generate a risk score based on one or more of the comparisons discussed above. In some embodiments, the risk score may correspond to a probability that the NRA user is identified in the one or more domestic governmental data stores. For example, in various embodiments, the risk score may be generated based on one or more of the name score, the ID score, the address score, the DOB score, the citizenship score, and/or the like. In some embodiments, one or more of the name score, the ID score, the address score, the DOB score, the citizenship score, and/or the like may have different weightages in the risk score depending on whether the score is associated with a primary attribute or a secondary attribute. For example, in some embodiments, a score associated with a primary attribute (e.g., the name score) may have a higher weightage in the risk score than one or more scores associated with a secondary attribute (e.g., the ID score, the address score, the DOB score, the citizenship score, and/or the like). In some embodiments, the scores associated with the secondary attributes may also have different weightages among each other as needed or desired.

In some embodiments, the OFAC verification service 230 may compare the risk score with a threshold risk score to identify a status (e.g., pass/fail) of the OFAC verification check. In some embodiments, the threshold risk score may be a threshold to ensure that effective material potential matches are identified, while keeping a false positive rate at a manageable level. For example, in some embodiments, the threshold risk score may be set considering a balance of an acceptable risk tolerance of missing valid matches with the provider institution's operational risk associated with an increased number of false positive matches. In this case, a more restrictive threshold (e.g., a higher threshold) may increase the chances of false positives, leading to an increased number of pending applications requiring further review, while a less restrictive threshold (e.g., a lower threshold) may lead to an increased number of approved applications for NRA users that should not have been approved.

For example, in some embodiments the threshold risk score may be set using an iterative process and observing the effectiveness of the matching. In this case, an initial threshold value may be selected considering threshold changes that result in greater decreases in matching effectiveness than adjacent threshold values. For example, if the matching effectiveness drops by 1% for each 1 point change in threshold between 1 and N (where N is a natural number), and the matching effectiveness drops by 5% between N and N+1 threshold value change, then N may be considered as a candidate for the initial threshold value. The initial threshold value may then be tuned, for example, according to data sample sizes d on the provider institution's risk tolerance level. For example, data sample sizes may be calculated according to a binomial distribution sample size calculation using Equation 1.

$$n = \frac{LN(\alpha)}{LN(1 - p_{ex})} \qquad \text{Equation 1}$$

Where α corresponds to a statistical confidence interval, $p_{ex}$ corresponds to risk tolerance rate for the provider institution, and n corresponds to a number of observations (e.g., sample size).

The maximum error rate (f(k, n, p)) may be determined using Equation 2.

$$f(k, n, p) = \binom{n}{k} p^k (1 - p)^{n-k} \qquad \text{Equation 2}$$

Where n corresponds to the number of observations, p corresponds to an incident rate (e.g., implicit risk tolerance level of the provider institution), and k corresponds to the number of true positive matches.

In some embodiments, control test data having the data sample size may be processed at the initial threshold value and various adjacent threshold values and the generated alert volume may be observed to determine a suitable threshold risk score. In various embodiments, the determination of the suitable threshold risk score may be experimentally performed, or may be learned and automatically adjusted over time. For example, in some embodiments, the OFAC verification service 230 may use a suitable machine learning method such as reinforcement learning (e.g., Q learning) to adjust the threshold risk score over time. In this case, for example, the OFAC verification service 230 may set an initial threshold risk score, observe the alerts and pending application statuses, determine the pending applications that are ultimately approved (e.g., upon further review), calculate a reward based on the number of pending applications resulting from the alerts that are ultimately approved upon further review, and adjust the threshold risk score based on the reward. However, the present disclosure is not limited thereto. In some embodiments, the OFAC verification service 230 may provide the status (e.g., pass/fail) and/or the risk score to the account creation service 234 at operation 338. In some embodiments, in the case that the risk score is provided to the account creation service 234, the account creation service 234 may compare the risk score with the threshold risk score instead of or in addition to the OFAC verification service 230.

In some embodiments, the PEP verification service 232 may determine whether the NRA user (or any family members or close associates of the NRA user) is a politically exposed person at operation 332. For example, in some embodiments, the PEP verification service 232 may query the one or more watch list data stores (e.g., via the 3rd party systems 106) based on various information provided by the NRA user and/or shown on the local foreign government-issued ID to identify one or more attributes (e.g., watch-list data) stored in the one or more watch-list data stores that may correspond to the NRA user. For example, in some embodiments, the PEP verification service 232 may compare the name, ID number, address, DOB, citizenship, and/or the like provided by the NRA user with name attributes, ID number attributes, address attributes, DOB attributes, citizenship attributes, and/or the like stored on the one or more watch list data stores.

In more detail, in some embodiments, the PEP verification service 232 may compare the name of the NRA user with the name attributes stored in the one or more watch list data stores to identify a name match, the name match being a name attribute that is similar to or the same as the name of the NRA user. The PEP verification service 232 may generate a name score corresponding to a probability that the name of the NRA user is the same as the name identified in the name match. In some embodiments, the PEP verification service 232 may compare the ID number associated with the NRA user (e.g., the unique identifier shown on the local foreign government ID) with ID number attributes stored in the one or more watch-list data stores to identify an ID match, the ID match being an ID number attribute that is similar to or the same as the ID number of the NRA user. The PEP verification service 232 may generate an ID score based on a comparison of an input value (e.g., the ID number input by the NRA user or as shown on the local foreign government ID) and a list value (e.g., the ID number identified in the one or more domestic governmental data stores). In some embodiments, the PEP verification service 232 may compare the address of the NRA user with the address attributes stored in the one or more watch list data stores to identify an address match, the address match being an address attribute that is similar to or the same as the address of the NRA user. The PEP verification service 232 may generate an address score based on a comparison of an input value (e.g., the address input by the NRA user) and a list value (e.g., the address identified in the one or more watch list data stores). In some embodiments, the PEP verification service 232 may compare the DOB of the NRA user with the DOB attributes stored in the one or more watch list data stores to identify a DOB match, the DOB match being a DOB attribute that is similar to or the same as the DOB of the NRA user. The PEP verification service 232 may generate a DOB score based on a comparison of an input value (e.g., the DOB input by the NRA user) and a list value (e.g., the DOB identified in the one or more watch list data stores). In some embodiments, the PEP verification service 232 may compare the citizenship of the NRA user with the citizenship attributes stored in the one or more watch list data stores to identify a citizenship match, the citizenship match being a citizenship attribute that is similar to or the same as the citizenship of the NRA user. The PEP verification service 232 may generate a citizenship score based on a comparison of an input value (e.g., the citizenship input by the NRA user) and a list value (e.g., the citizenship identified in the one or more watch list data stores).

For example, in some embodiments, the PEP verification service 232 may categorize each of the name match, the ID match, the address match, the DOB match, the citizenship match, and/or the like into various matching categories to generate the corresponding scores. For example, in some embodiments, each of the name match, the ID match, the address match, the DOB match, and the citizenship match may be categorized into one of an exact match category, a fuzzy match category, an enhanced match category, and/or a no match category. The exact match category may correspond to an attribute of the NRA user that is an exact match to an attribute stored in the one or more watch-list data stores. The fuzzy match category may correspond to an attribute of the NRA user that is reasonably close (e.g., one or two missing letters, switched letters, switched words, and/or the like) to an attribute stored in the one or more watch-list data stores, for example, based on common scenarios (e.g., misspelling, additional string, additional substring, and/or the like). The enhanced match category may correspond to an attribute of the NRA user that is different or not similar enough to the attributes stored in the one or more watch-list data stores, such that other attribute matches should be considered. For example, in some embodiments, when a match is categorized into the enhanced match categories, it may indicate that other attribute matches (e.g., a primary attribute match such as name or the like) are close enough that the differences in the corresponding attribute match do not warrant a no match categorization. The no match category may correspond to an attribute of the NRA user that is not a match to attributes stored in the one or more watch-list data stores, and at least one of the other attributes also do not match. In some embodiments, the corresponding scores may be generated based on the matching categories.

In some embodiments, the PEP verification service 232 may generate a compliance score based on one or more of the comparisons discussed above. In some embodiments, the compliance score may correspond to a probability that the NRA user is identified in the one or more watch-list data stores. For example, in various embodiments, the compliance score may be generated based on one or more of the name score, the address score, the DOB score, the citizenship score, and/or the like. In some embodiments, one or more of the name score, the ID score, the address score, the DOB score, the citizenship score, and/or the like may have different weightages in the compliance score depending on whether the score is associated with a primary attribute or a secondary attribute. For example, in some embodiments, a score associated with a primary attribute (e.g., the name score) may have a higher weightage in the compliance score than one or more scores associated with a secondary attribute (e.g., the ID score, the address score, the DOB score, the citizenship score, and/or the like). In some embodiments, the scores associated with the secondary attributes may also have different weightages among each other as needed or desired.

In some embodiments, the PEP verification service 232 may compare the compliance score with a threshold compliance score to identify a status (e.g., pass/fail) of the PEP verification check. In some embodiments, the threshold compliance score may be a threshold to ensure that effective material potential matches are identified, while keeping a false positive rate at a manageable level. For example, in some embodiments, the threshold compliance score may be set considering a balance of an acceptable risk tolerance of missing valid matches with the provider institution's operational risk associated with an increased number of false positive matches. In this case, a more restrictive threshold (e.g., a higher threshold) may increase the chances of false positives, leading to an increased number of pending applications requiring further review, while a less restrictive threshold (e.g., a lower threshold) may lead to an increased number of approved applications for NRA users that should not have been approved.

For example, in some embodiments the threshold compliance score may be set using an iterative process and observing the effectiveness of the matching, similar to or substantially the same as the process for setting the threshold risk score discussed above. For example, in some embodiments, an initial threshold compliance score may be set and tuned according to Equations 1 and Equations 2 discussed above, and thus, redundant description thereof may not be repeated. In some embodiments, the threshold risk score may be different from the threshold compliance score based on, for example, at least different risk tolerances of the provider institution when performing the OFAC check versus when performing the PEP check. For example, in some embodiments, the provider institution may have a higher risk tolerance rate for PEP checks when compared to OFAC checks. Accordingly, in some embodiments, each of the threshold risk tolerance and the threshold compliance score may have suitable threshold levels depending on the risk tolerances of the provider institution when performing the OFAC check and the PEP check. In some embodiments, the PEP verification service 232 may provide the status (e.g., pass/fail) and/or the compliance score to the account creation service 234 at operation 340. In some embodiments, in the case that the compliance score is provided to the account creation service 234, the account creation service 234 may compare the compliance score with the threshold compliance score instead of or in addition to the PEP verification service 232.

As shown in FIG. 4D, in some embodiments, each of the identification verification, the OFAC verification, and the PEP verification may be performed concurrently (e.g., simultaneously). Concurrent processing of each of the identification verification, the OFAC verification, and the PEP verification may improve a processing time of the NRA user's application. For example, sequential processing of each of the identification verification, the OFAC verification, and the PEP verification may take a matter of minutes to perform, which may be too long for the NRA user to wait for a next page to load, whereas concurrent processing of each of the identification verification, the OFAC verification, and the PEP verification may be completed within a matter of seconds.

However, the present disclosure is not limited thereto, and in other embodiments, at least one of (or each of) the of the identification verification, the OFAC verification, and the PEP verification may be performed sequentially. For example, in other embodiments, the ID verification may first be performed and then the OFAC verification and the PEP verification may be performed concurrently (e.g., simultaneously) after the ID verification passes, or each of the identification verification, the OFAC verification, and the PEP verification may be performed sequentially (e.g., when a previous verification passes). In this case, if any of the previous (or prior) verification fails, subsequent verifications may be skipped to reduce resources. For example, if the ID verification fails, than the OFAC verification and the PEP verification may be subsequently skipped, so that resources are not unnecessarily spent verifying a potential mistake by the NRA user when inputting the information, or a potential fraudster posing as the NRA user.

In some embodiments, the account creation service 234 may determine from each of the statuses (e.g., 326, 328, 330, and/or 332) whether the NRA user's application may be automatically approved, automatically denied, or should be placed in a pending state for further review (e.g., by a case manager or other provider institution employee) at operation 342. For example, in some embodiments, the account creation service 234 may set one or more flags (or bits) corresponding to an approved status, a denied status, or a pending status depending on the pass/fail of the various verifications by the threat intelligence service 222, the ID verification service 228, the OFAC verification service 230, and/or the PEP verification service 232. For example, if each of the verifications passes, then the application may be assigned the approved status, such that the application is automatically approved and the account creation service 234 automatically creates an account for the NRA user at operation 342. On the other hand, if the threat intelligence verification fails, the application may be assigned the denied status such that the application is automatically denied by the account creation service 234 at operation 342. Further, if any one or more of the ID verification, the OFAC verification, and/or the PEP verification fails, the application may be assigned the pending status, such that the application is flagged for further review at operation 342.

In some embodiments, the account creation service 234 provides the status to the customer interface 210, such that the customer interface 210 may provide an appropriate page flow to the NRA device 104. For example, if the account creation service 234 provides the denied status to the customer interface 210 at operation 344, the customer interface 210 may provide the stop page to the NRA device 104 at operation 346. In another example, if the account creation service 234 provides the pending status to the customer interface 210 at operation 344, the customer interface 210 may provide a confirmation page (e.g., an application received page, or an application pending for further review page) to the NRA device 104 at operation 346. In still another example, if the account creation service 234 provides the approved status to the customer interface 210 at operation 344, the customer interface 210 may provide a success page to the NRA device 104 at operation 346. In this case, in some embodiments the account creations service 234 may further provide account information (e.g., an account number) relating to the account that was created for the NRA user, such that the success page may provide the account information to the NRA customer.

Figure 5:
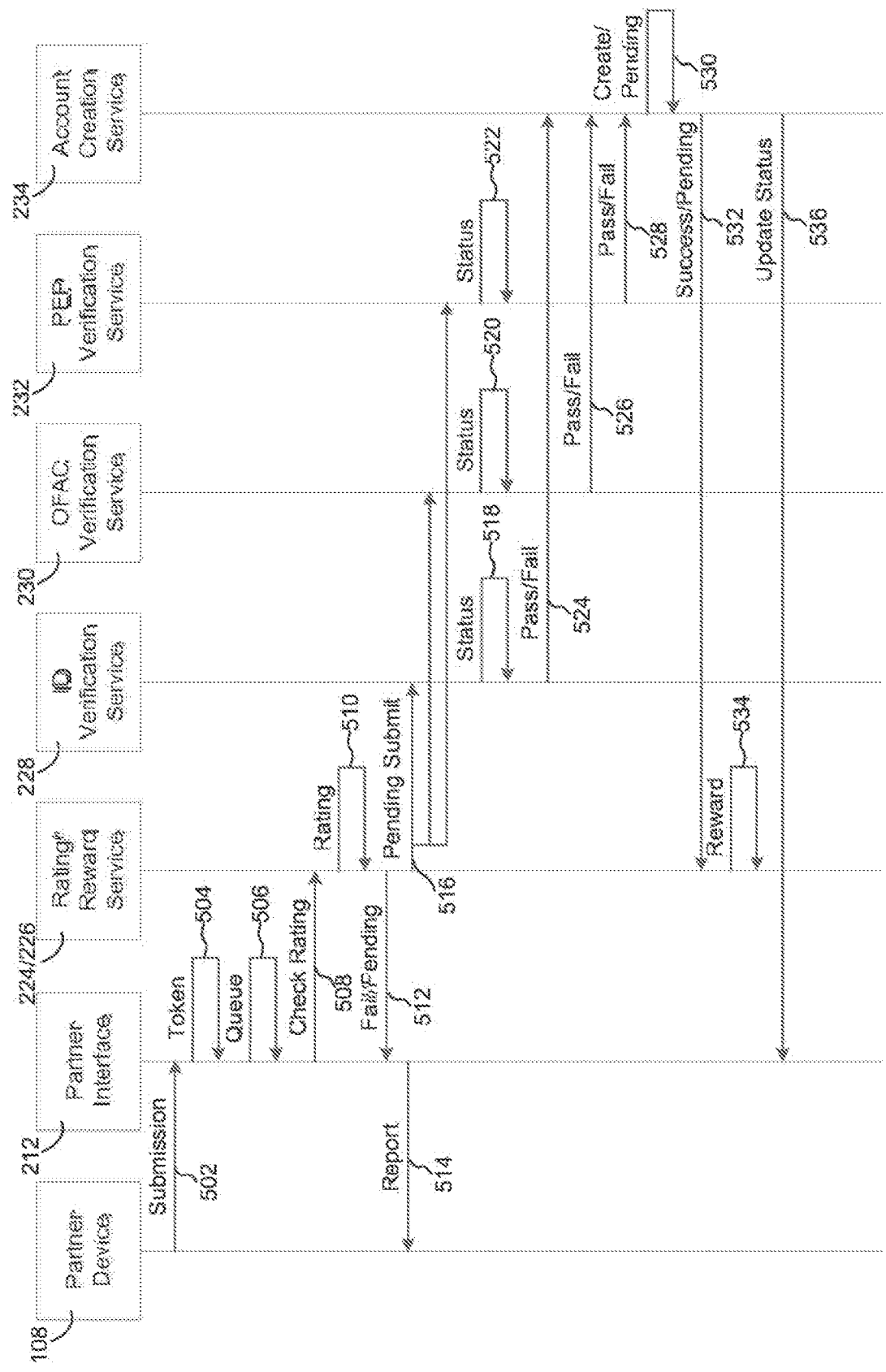
FIG. 5 is a signaling diagram of a method for remotely onboarding non-resident aliens through partner submissions.

FIG. 5 is a signaling diagram of a method for remotely onboarding non-resident aliens through partner submissions.

Referring to FIG. 5, in some embodiments, a registered partner may use the partner device 108 to submit (e.g., via API) one or more applications to the provider computing system 102 on behalf of one or more potential NRA customers at operation 502. For example, in various embodiments, the partner device 108 may batch submit a plurality of applications at operation 502, and/or may submit a single application at a time at operation 502. In some embodiments, the registered partner may use the partner device 108 to submit the one or more applications to the provider computing system 102 via the partner interface 212. In some embodiments, each of the applications may include, for example, identification information, personal information, employment information, address information, background information, expected account usage information, and/or the like of each corresponding potential NRA customer solicited by the registered partner.

In some embodiments, because the registered partner (or the partner device 108) is registered with the provider computing system 102, the submission may be validated using a token (e.g., a security token) that is provided to the registered partner (or the partner device 108) during the registration of the registered partner, in some embodiments. In this case, in some embodiments, the threat intelligence checks may be skipped and/or may be performed by a computing system associated with the registered partner (e.g., the partner device 108) when soliciting information from the potential NRA customers by the registered partner. Accordingly, in some embodiments, the submission at operation 502 may include a token associated with the registered partner (or the partner device 108).

In some embodiments, the partner interface 212 may validate the token at operation 504 to determine whether the submission was authorized. For example, in some embodiments, the partner interface 212 may determine whether the registered partner or the partner device 108 is authorized to submit applications based on the token. If the token is not valid, then the partner interface 212 may provide a message to the partner device 108 to try again. On the other hand, in some embodiments, in response to determining that the token is valid, the partner interface 212 may store the submission in a queue at operation 506.

In some embodiments, the partner interface 212 may check a rating (e.g., a flow rating) of the partner at operation 508. For example, in some embodiments, the partner interface 212 may communicate with the rating service 224 at operation 508, and the rating service 224 may check the rating of the registered partner at operation 510. In some embodiments, the rating may be a time-limited flow rating to limit a number of submissions (or a number of applications per submission) at a given time to control workflow load on the resources of the provider computing system 102 at any given time. For example, in various embodiments, the rating may limit a number of single submissions within a time period, a number of batch submission within a time period, a number of applications within a single batch submission, and/or the like. In various embodiments, the rating may be used, for example, to reduce a workflow load on the provider computing system 102 at any given time, and/or to provide an incentive to the registered partner to control a quality of the applications that have been submitted.

Accordingly, in some embodiments, the rating service 224 may check the rating of the registered partner at operation 510. For example, in various embodiments, the rating service 224 may determine whether a threshold period of time has lapsed since a last submission time of the registered partner, whether a threshold number of submissions has been exceeded within a time period, whether a threshold number of applications has been exceeded in the submission, and/or the like.

In some embodiments, the rating service 224 may provide a result of the ratings check (e.g., fail/pending) to the partner interface 212 at operation 512. For example, a fail result may indicate that the submission at operation 502 has exceeded the rating allowed for the registered partner. In this case, in some embodiments, the partner interface 212 may hold the submission in the queue, and may retry the submission a threshold number of times (e.g., 3 times) before reporting the failure to the partner device 108 at operation 514. On the other hand, a pending status may indicate that the submission is within the rating and that the applications are being processed. In this case, in some embodiments, the partner interface 212 may report to the partner device 108 that the applications are pending at operation 514, and the applications may be submitted at operation 516 to be verified by the ID verification service 230, the PEP verification service 232, and the account creation service 234 at operations 518, 520, and 522, respectively.

For example, in some embodiments, the ID verification service 228, the OFAC verification service 230, and the PEP verification service 232, may each perform its respective verifications concurrently (e.g., simultaneously) with each other, but the present invention is not limited thereto, and in other embodiments, at least one of the verifications may be performed sequentially after the other verifications, as discussed above. Accordingly, in some embodiments, the ID verification service 228 may provide the ID verification status (e.g., pass/fail) to the account creation service 234 at operation 524, the OFAC verification service 230 may provide the OFAC verification status (e.g., pass/fail) to the account creation service 234 at operation 526, and the PEP verification service 232 may provide the PEP verification status (e.g., pass/fail) to the account creation service 234 at operation 528. The ID verification, OFAC verification, and PEP verification for the partner submission may be the same as or substantially the same as those discussed above for the NRA user submission, and thus, redundant description thereof may not be repeated.

In some embodiments, the account creation service 234 may determine from each of the statuses (e.g., 524, 526, and/or 528) whether the NRA user's application may be automatically approved or should be placed in a pending state for further review (e.g., by a case manager or other provider institution employee) at operation 530. For example, in some embodiments, the account creation service 234 may set one or more flags (or bits) corresponding to an approved status or a pending status depending on the pass/fail of the various verifications by the ID verification service 228, the OFAC verification service 230, and/or the PEP verification service 232. For example, if each of the verifications passes, then the application may be assigned the approved status, such that the application is automatically approved and the account creation service 234 automatically creates an account for the potential NRA customer at operation 530. On the other hand, if any one or more of the ID verification, the OFAC verification, and/or the PEP verification fails, the application may be assigned the pending status, such that the application is flagged for further review at operation 530.

In some embodiments, the account creation service 234 provides the status (e.g., success/pending) to the reward service 226 at operation 532, and to the partner interface 212 at operation 536. In some embodiments, the partner interface 212 may update the status of the pending application based on the status, such that the registered partner is informed of the updated status. For example, in some embodiments, if the application is approved, the status of the pending application is updated to approved, such that the registered partner is informed of the approved application. In some embodiments, if the application is approved, the potential NRA customer is informed with the account information (e.g., account number) of the account established with the provider computing system 102.

In some embodiments, the reward service 226 may determine an appropriate reward for the registered partner at operation 534 based on the status. For example, in some embodiments, the reward service 226 may calculate a ratio for the registered partner corresponding to a number of submitted applications and a number of approved applications. In some embodiments, the reward service 226 may determine an appropriate reward for the registered partner based on the ratio. For example, in some embodiments, the reward service 226 may compare the ratio with a threshold value to determine the appropriate reward. In various embodiments, the reward may be used to incentivize the registered partner to submit quality applications. For example, the reward may be to increase (or decrease) the rating associated with the registered partner to incentivize the registered partner to submit more quality applications. However, the present disclosure is not limited thereto, and the reward may be any suitable reward that incentivizes the registered partner to submit quality applications. In some embodiments, the ratio may be time limited, such that the ratio corresponds to the number of submitted applications and the number of approved applications with a time period (e.g., 1 week, 1 month, 1 year, or the like).

However, the present disclosure is not limited thereto, and in other embodiments, the reward service 226 may be omitted. For example, in some embodiments, the flow rating may be adjusted manually (e.g., by an operator of the provider computing system) based on, for example, the ratio of approved applications to submitted applications. In still other embodiments, the rating service 224 may be omitted. For example, in some embodiments, the reward service 226 may calculate the ratio of approved applications to submitted applications for analytical purposes. In this case, the analytics may be used, for example, to determine whether additional partners should be added, one or more existing partners should be removed, other industry partners to target, and/or the like.

Figure 6:
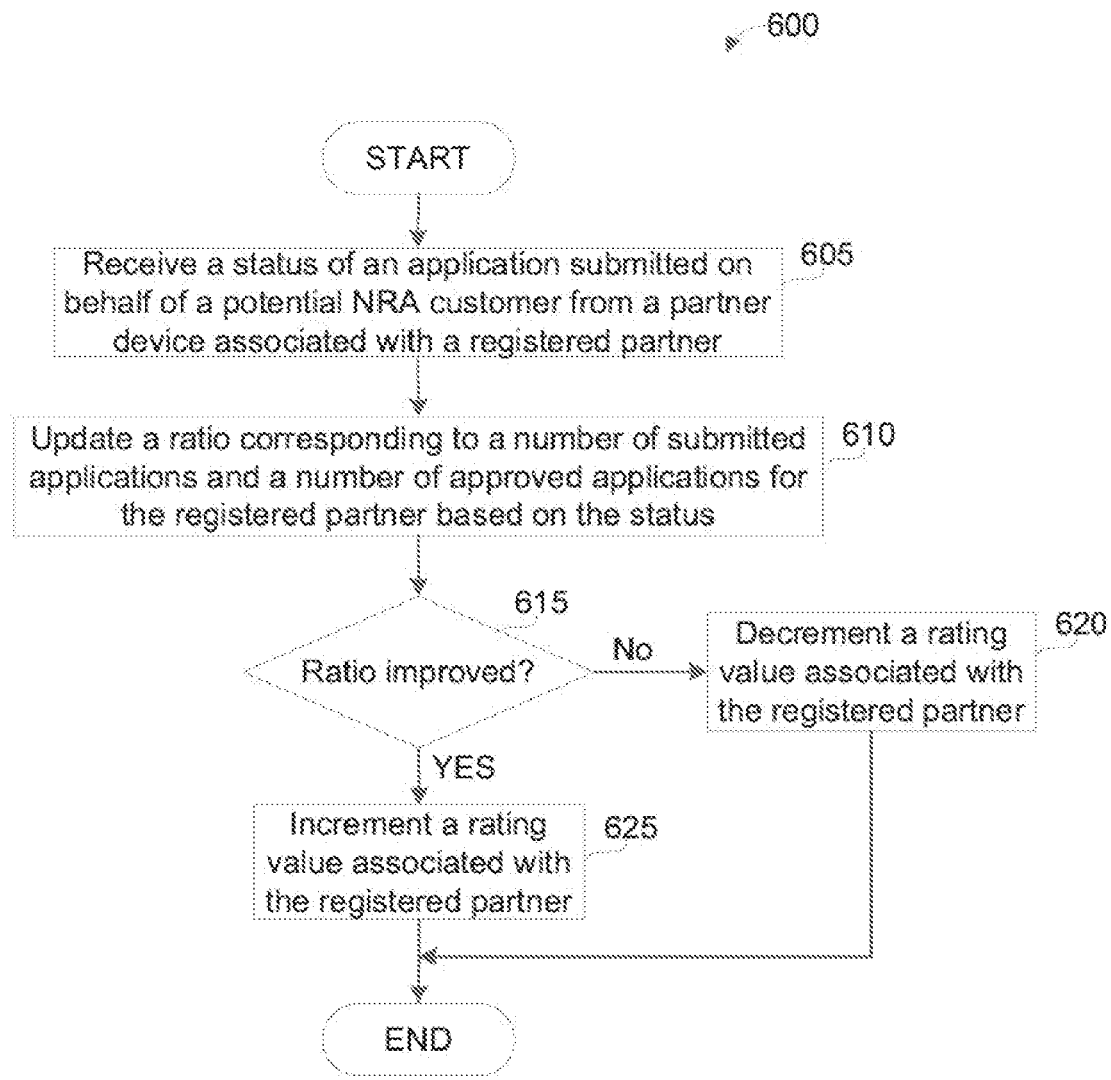
FIG. 6 is a flow diagram of a method for determining a reward for a registered partner, according to some embodiments.

FIG. 6 is a flow diagram of a method for determining a reward for a registered partner, according to some embodiments.

In some embodiments, the reward service 226 may determine a reward for the registered partner based on the status of the application using the method 600. Referring to FIG. 6, the account creation service 234 provides the status of the potential NRA customer's application to the reward service 226 at operation 532 in FIG. 5, and the method 600 starts with the reward service 226 receiving the status of the application, which was submitted on behalf of the potential NRA customer from a partner device associated with a registered partner at block 605.

For example, in some embodiments, the reward service 226 may update a ratio corresponding to a number of submitted applications by the registered partner and a number of approved applications for the registered partner based on the status at block 610. In some embodiments, the number of applications considered for the ratio (e.g., the number of submitted applications) may be time limited to a desired time period (e.g., 1 week, 1 month, 1 year, or the like), such that the ratio considers the applications within the time period. In other embodiments, the ratio may correspond one to one for each application submitted. For example, in some embodiments, the ratio may correspond to whether a particular application that was submitted is approved or denied. In still other embodiments, the ratio may correspond to a total number of applications submitted by the registered partner and a total number of applications that have been approved.

The reward 226 service determines whether the ratio improves at block 615. For example, in some embodiments, the reward service 226 may compare the ratio with one or more threshold ratio values to determine whether the ratio improves or declines at block 615. In some embodiments, if the reward service 226 determines that the ratio did not improve at block 615 (e.g., NO), a rating value associated with the registered partner may be decremented at block 620. For example, in some embodiments, the reward service 226 may compare the ratio with a first threshold ratio value, and if the ratio is less than the first threshold ratio value, the rating value associated with the registered partner may be decremented. In this case, the reward service 226 may communicate with the rating service 224 to set the new rating value according to the decrement, and the method may end.

On the other hand, in some embodiments, if the reward service 226 determines that the ratio improved at block 615 (e.g., YES), then a rating value associated with the registered partner may be incremented at block 625. For example, in some embodiments, the reward service 226 may compare the ratio with a second threshold ratio value, and if the ratio is greater than the second threshold ratio value, the rating value associated with the registered partner may be incremented. In this case, the reward service 226 may communicate with the rating service 224 to set the new rating value according to the increment, and the method may end.

According to some example embodiments, the rating service 224 and the reward service 226 may control a throughput of the registered partner's submission based on the rating value of the registered partner. For example, when the rating value is increased, the registered partner may be enabled to submit more application submissions at a given time. On the other hand, if the rating value is decreased, the registered partner may be restricted to submitting less application submissions at a given time. Accordingly, the rating service and reward service may incentivize the registered partner to vet the potential NRA customers more effectively, while controlling the amount of workflow load on the resources of the provider computing system 102.

However, the present disclosure is not limited thereto. For example, in other embodiments, the flow rating may be adjusted manually (e.g., by an operator of the provider computing system) based on, for example, the ratio of approved applications to submitted applications. In still other embodiments, the ratio may be used for analytics purposes, rather than being used to calculate a reward.

While one or more example embodiments of the present disclosure are described with reference to the attached drawings, it should be understood that embodiments described herein should be considered in a descriptive sense only and not for purposes of limitation. Accordingly, those with ordinary skill in the art of which the present invention pertains will understand that various aspects and features of the present invention may be modified without departing from the spirit and scope of the present invention as defined in the following claims, and their equivalents.

What is claimed is:

1. A method for remotely verifying a non-resident alien's identity, the method comprising:
receiving, by one or more processors, a request to establish a communication session from a user device associated with the non-resident alien;
analyzing, by the one or more processors, the request to determine whether the user device is compromised;
determining, by the one or more processors, that the user device is not compromised;
in response to determining that the user device is not compromised, providing, by the one or more processors, a page flow to the user device to solicit information from the non-resident alien, the solicited information comprising identification information shown on a local foreign government identification document (ID), and other information not shown on the local foreign government ID;

receiving, by the one or more processors, the solicited information;

querying, by the one or more processors, one or more foreign governmental data stores to identify foreign data associated with the non-resident alien based on an identifier assigned to the non-resident alien from among the identification information shown on the local foreign government ID;

comparing, by the one or more processors, the solicited information with the foreign data; and verifying, by the one or more processors, an identity of the non-resident alien based on the comparing, wherein the verifying comprises determining, by the one or more processors, that at least one of the other information not shown on the local foreign government ID matches the foreign data; and validating, by the one or more processors, the solicited information against one or more domestic governmental data stores or against one or more watch-list data stores.

2. The method of claim 1, wherein the analyzing of the request to determine whether the device is compromised comprises:

identifying, by the one or more processors, a source address from session information included in the request; and determining, by the one or more processors, whether the source address corresponds to a blocked geographical location.

3. The method of claim 2, wherein the determining whether the source address corresponds to a blocked geographical location comprises:

comparing, by the one or more processors, the source address with a list of blocked IP addresses.

4. The method of claim 1, wherein the analyzing of the request to determine whether the device is compromised comprises:

identifying, by the one or more processors, device information associated with the user device, the device information included in the request; and determining, by the one or more processors, whether the user device has malware based on the device information.

5. The method of claim 4, wherein the determining of whether the user device has malware comprises:

identifying, by the one or more processors, one or more applications installed on the user device; and comparing, by the one or more processors, the one or more applications with a list of applications known to be associated with malware.

6. The method of claim 1, further comprising generating, by the one or more processors, a validation score corresponding to a risk probability associated with the non-resident alien, the validation score comprising a first score component and a second score component.

7. The method of claim 6, wherein the validating of the solicited information against the one or more domestic governmental data stores and the validating of the solicited information against the one or more watch-list data stores are both performed by the one or more processors concurrently.

8. The method of claim 6, wherein the validating of the solicited information against the one or more domestic governmental data stores comprises:

querying, by the one or more processors, one or more domestic governmental data stores based on the solicited information to identify domestic data corresponding to the non-resident alien;

comparing, by the one or more processors, the solicited information with the domestic data;

identifying, by the one or more processors, one or more names associated with the domestic data that are similar to or the same as a name of the non-resident alien; and calculating, by the one or more processors, a first validation score indicating a probability match that the one or more similar or the same names correspond to the non-resident alien.

9. The method of claim 8, wherein the validating of the solicited information against the one or more watch-list data stores comprises:

querying, by the one or more processors, one or more watch-list data stores based on the solicited information to identify watch-list data corresponding to the non-resident alien;

comparing, by the one or more processors, the solicited information with the watch-list data;

identifying, by the one or more processors, one or more names associated with the watch-list data that are similar to or the same as a name of the non-resident alien; and calculating, by the one or more processors, a second validation score indicating a probability match that the one or more similar or the same names correspond to the non-resident alien.

10. The method of claim 9, further comprising:

comparing, by the one or more processors, the first validation score with a first threshold value to determine the first score component of the validation score;

comparing, by the one or more processors, the second validation score with a second threshold value to determine the second score component of the validation score;

determining, by the one or more processors, whether each of the first score component and the second score component indicates a passing score; and assigning, by the one or more processors, a status to an application associated with the non-resident alien based on the first score component and the second score component, wherein the application is automatically approved, by the one or more processors, in response to both the first score component and the second score component indicating the passing score, and wherein the application is flagged, by the one or more processors, in a pending state for further review in response to at least one of the first score component and the second score component indicating a failing score.

\* \* \* \* \*